US009630621B2

(12) United States Patent
Kurata

(10) Patent No.: US 9,630,621 B2
(45) Date of Patent: Apr. 25, 2017

(54) AUTOMATIC DRIVE CONTROL METHOD FOR VEHICLE

(71) Applicant: TOYOTA JIDOSHA KABUSHIKI KAISHA, Toyota-shi, Aichi-ken (JP)

(72) Inventor: Fumito Kurata, Gotenba (JP)

(73) Assignee: TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 0 days.

(21) Appl. No.: 15/100,414

(22) PCT Filed: Feb. 20, 2015

(86) PCT No.: PCT/JP2015/055497
§ 371 (c)(1),
(2) Date: May 31, 2016

(87) PCT Pub. No.: WO2015/125975
PCT Pub. Date: Aug. 27, 2015

(65) Prior Publication Data
US 2016/0347311 A1 Dec. 1, 2016

(30) Foreign Application Priority Data

Feb. 21, 2014 (JP) ................................. 2014-032231

(51) Int. Cl.
B62D 6/00 (2006.01)
G06F 7/00 (2006.01)
(Continued)

(52) U.S. Cl.
CPC .......... B60W 30/12 (2013.01); B60W 30/045 (2013.01); B60W 30/08 (2013.01);
(Continued)

(58) Field of Classification Search
USPC ....... 701/41–42, 96, 300; 180/170; 340/435, 340/903
See application file for complete search history.

(56) References Cited

U.S. PATENT DOCUMENTS 3,067,832 A * 12/1962 Wohl ..................... B64C 25/50
244/50
7,424,858 B2 * 9/2008 Matsuda .................. G01D 5/04
114/144 E
(Continued)

FOREIGN PATENT DOCUMENTS

EP 1538019 A2 * 8/2005 .......... B60T 8/17557
EP 2223837 A1 * 1/2010 .......... B60W 30/025
(Continued)

OTHER PUBLICATIONS

Research on control strategy and bench test of automobile Steer-by-Wire system; Yu Lei-yan; Qi Yao-guang; Liu Feng 2008 IEEE Vehicle Power and Propulsion Conference; Year: 2008; pp. 1-6, DOI: 10.1109/VPPC.2008.4677534.*
(Continued)

Primary Examiner — Cuong H Nguyen
(74) Attorney, Agent, or Firm — Sughrue Mion, PLLC

(57) ABSTRACT

Provided is an automatic drive control method for a vehicle in which, as a target control quantity for automatically controlling a rudder angle of front wheels, a target control quantities $\Delta\theta ptj$ of a pinion angle for the current cycle to the c-th cycle are calculated by prediction according to parameters for trajectory control based on a driving situation of the vehicle; and when a magnitude of a target control quantity $\Delta\theta pt1$ for the current cycle is less than a preliminarily set reference value P and it is determined that the probability is high that the target control quantity $\Delta\theta ptj$ has a sign identical to a sign for the current cycle and the magnitude thereof increases to the reference value P or above by the c-th cycle
(Continued)

at the latest, the magnitude of the target control quantity $\Delta\theta pt1$ for the current cycle is increasingly corrected to the reference value P.

4 Claims, 12 Drawing Sheets

(51) Int. Cl.
| | |
|---|---|
| *G08G 1/00* | (2006.01) |
| *B60W 30/12* | (2006.01) |
| *B62D 15/02* | (2006.01) |
| *B60W 30/08* | (2012.01) |
| *B60W 30/10* | (2006.01) |
| *B60W 40/068* | (2012.01) |
| *B60W 30/045* | (2012.01) |
| *B60W 40/114* | (2012.01) |
| *B60W 50/08* | (2012.01) |
| *G05D 1/00* | (2006.01) |

(52) U.S. Cl.
CPC .......... *B60W 30/10* (2013.01); *B60W 40/068* (2013.01); *B60W 40/114* (2013.01); *B60W 50/085* (2013.01); *B62D 15/025* (2013.01); *G05D 1/0061* (2013.01); *B60W 2520/125* (2013.01); *B60W 2710/18* (2013.01); *B60W 2710/207* (2013.01)

(56) References Cited

U.S. PATENT DOCUMENTS

| | | | | |
|---|---|---|---|---|
| 8,718,872 | B2* | 5/2014 | Hirao | B60G 17/08 |
| | | | | 701/38 |
| 9,399,464 | B2* | 7/2016 | Kunihiro | B62D 15/025 |
| 2005/0125153 | A1* | 6/2005 | Matsumoto | B60T 8/17557 |
| | | | | 701/300 |
| 2005/0222744 | A1* | 10/2005 | Sakata | B60T 8/1755 |
| | | | | 701/70 |
| 2008/0009993 | A1* | 1/2008 | Matsuda | G01D 5/04 |
| | | | | 701/41 |
| 2009/0088918 | A1* | 4/2009 | Takenaka | B60T 8/17551 |
| | | | | 701/31.4 |
| 2010/0222965 | A1* | 9/2010 | Kimura | B60W 30/025 |
| | | | | 701/41 |
| 2011/0205042 | A1* | 8/2011 | Takemura | G08G 1/166 |
| | | | | 340/435 |
| 2012/0078470 | A1* | 3/2012 | Hirao | B60G 17/08 |
| | | | | 701/38 |
| 2015/0134204 | A1* | 5/2015 | Kunihiro | B62D 15/025 |
| | | | | 701/41 |

FOREIGN PATENT DOCUMENTS

| | | | |
|---|---|---|---|
| JP | 2005-067484 A | 3/2005 | |
| JP | 02005067484 A * | 3/2005 | ............... B62D 6/00 |
| WO | WO 2010038851 A1 * | 8/2010 | ............. G08G 1/166 |

OTHER PUBLICATIONS

Curvature-Based Ground Vehicle Control of Trailer Path Following Considering Sideslip and Limited Steering Actuation Zhe Leng; Mark A. Minor; IEEE Transactions on Intelligent Transportation Systems; Year: 2016, vol. PP, Issue: 99 pp. 1-17, DOI: 10.1109/TITS.2016.2572208.*

Design of stability augmentor for aircraft nose wheel steering system based on Hopfield network identification algorithm Dan-dan Zhu; Yu-hong Jia; 2011 International Conference on Electric Information and Control Engineering; Year: 2011 pp. 3196-3201, DOI: 10.1109/ICEICE.2011.5777740.*

2-D motion estimation using two parallel receive beams; L. N. Bohs; S. C. Gebhart; M. E. Anderson; B. J. Geiman; G. E. Trahey IEEE Transactions on Ultrasonics, Ferroelectrics, and Frequency Control; Year: 2001, vol. 48, Issue: 2; pp. 392-408, DOI: 10.1109/58.911722.*

* cited by examiner

AUTOMATIC DRIVE CONTROL METHOD FOR VEHICLE

CROSS REFERENCE TO RELATED APPLICATIONS

This application is a National Stage of International Application No. PCT/JP2015/055497, filed Feb. 20, 2015, claiming priority based on Japanese Patent Application No. 2014-032231, filed Feb. 21, 2014, the contents of all of which are incorporated herein by reference in their entirety.

TECHNICAL FIELD

The present invention relates to an automatic drive control method for a vehicle wherein at least one of a rudder angle of steered wheels and a braking/driving force of the vehicle is automatically controlled based on a target control quantity.

BACKGROUND ART

In automatic drive control for a vehicle such as an automobile, a target control quantity is calculated according to a driving situation of the vehicle, and a rudder angle of steered wheels and a braking/driving force of the vehicle are automatically controlled based on the target control quantity. For example, JP2005-67484A mentioned below (hereinafter referred to as Patent Document 1) discusses a cruise control device that calculates, as a target control quantity, a feedback control quantity regarding a lateral-direction position of a vehicle for causing the vehicle to travel following a target course, and controls a rudder angle of front wheels based on the feedback control quantity.

CITATION LIST

Patent Literature

[Patent Literature 1] JP2005-67484A

SUMMARY OF INVENTION

Technical Problem

In automatic drive control for a vehicle, a rudder angle of steered wheels is controlled by a rudder angle varying device or the like when the steered wheels are turned by the same, whereas a braking/driving force of the vehicle is controlled by a braking device and an engine/transmission when outputs thereof are increased/decreased. An actuator of a rudder angle varying device and the like is controlled based on a control instruction from a control device, and generates a driving force and the like for turning steered wheels according to a target control quantity contained in the control instruction.

Since the actuator such as a rudder angle varying device includes movable portions, when the magnitude of the target control quantity is small, the actuator cannot generate a driving force and the like enough to turn the steered wheels due to friction resistances and the like of the movable portions. In the case where the magnitude of the target control quantity gradually increases from a very small value, like upon start of the control, this therefore results in the following situation: even when a control instruction is issued by the control device, the rudder angle of the steered wheels and the like is not actually controlled until the target control quantity increases to such a value that can cause the actuator to generate the driving force and the like.

The following method may be available in order to solve the above-described problem in the case where the magnitude of the target control quantity gradually increases from a very small value; a certain correction value is added to the target control quantity in the case where the target control quantity has a small magnitude. This method allows the control of a rudder angle of steered wheels and the like to be started easily and early. This however results in that the magnitude of the target control quantity is increased whenever the target control quantity has a small magnitude, which causes the control of a rudder angle of steered wheels and the like to be unnecessarily executed in some cases, and causes the behavior of the vehicle to tend to be sensitive due to the control of a rudder angle of steered wheels and the like.

The principal object of the present invention is to cause an operation of changing a rudder angle of steered wheels and the like to actually start according to automatic drive control in a situation in which such a change preferably starts, while preventing unnecessary execution of control of the rudder angle of the steered wheels and the like, and preventing the behavior of the vehicle from becoming sensitive.

Solution to Problem and Advantageous Effects of Invention

The present invention provides an automatic drive control method for a vehicle, wherein a target control quantity for automatically controlling at least either one of a rudder angle of a steered wheel and a braking/driving force of the vehicle is calculated for each control cycle according to a driving situation of the vehicle, and at least either one of the rudder angle of the steered wheel and the braking/driving force of the vehicle is automatically controlled based on the target control quantity, the method comprising the steps of: calculating at least a target control quantity for a current cycle and target control quantities for a first cycle to a second cycle as future target control quantities, the first and second cycles being after the current cycle; and increasingly correcting a magnitude of the target control quantity for the current cycle to a value equal to or more than a preliminarily set reference value, in a situation in which the magnitude of the target control quantity for the current cycle is less than the reference value, in the case where it is determined based on the future target control quantities that a probability is high that the future target control quantity has a sign identical to the sign of the target control quantity for the current cycle and the magnitude thereof increases to the reference value or above by the second cycle at the latest.

According to the above-described configuration, regarding each control cycle, at least a target control quantity for a current cycle and target control quantities for a first cycle to a second cycle both of which are after the current cycle is calculated as future target control quantities. When the magnitude of the target control quantity for the current cycle is less than a preliminarily set reference value, it is determined based on the future target control quantity whether the probability is high that the magnitude of the future target control quantity increases to the reference value or above. In particular, when it is determined that the probability is high that the future target control quantity has a sign identical to that of the target control quantity for the current cycle and the magnitude thereof increases to the reference value or above by the second cycle at the latest, the magnitude of the target control quantity for the current cycle is increasingly corrected to a value equal to or more than the reference value.

Therefore, when the probability is high that the magnitude of the future target control quantity increases to the reference value or above by the second cycle at the latest, it is possible to automatically control at least either one of the rudder angle of the steered wheels and the braking/driving force of the vehicle with the target control quantity which is increasingly corrected to the reference value or above in the current cycle. Therefore, an operation of changing the rudder angle of the steered wheels and the like can be caused to actually start according to automatic drive control in a situation in which such a change preferably starts.

Further, according to the above-described configuration, as compared with a case where the magnitude of the target control quantity for the current cycle is increasingly corrected to the reference value or above without determination of the probability that the magnitude of the target control quantity would increase to the reference value or above, the risk of unnecessarily increasingly correcting the magnitude of the target control quantity can be reduced. Therefore, it is possible to prevent control of the rudder angle of the steered wheels and the like from being unnecessarily executed, and to prevent the behavior of the vehicle from becoming sensitive.

Further, according to the above-described configuration, not only when the probability is high that the magnitude of the target control quantity increases to a reference value of a dead band or above but also when the magnitude increases to the reference value or above, having a sign identical to the sign for the current cycle, the magnitude of the target control quantity for the current cycle is increased for correction. Therefore, it is possible to prevent the magnitude of the target control quantity for the current cycle from being increasingly corrected to the reference value or above, with a sign different from the sign of the target control quantity for the current cycle. Therefore, it is possible to prevent at least one of the rudder angle of the steered wheels and the braking/driving force of the vehicle from being controlled in a direction opposite to the direction in which the same should be automatically controlled thereafter (left or right, acceleration or deceleration).

Further, in the above-described configuration, the reference value may be set to at least either one of: a value of a control quantity having a minimum magnitude, among control quantities that cause a device for changing a rudder angle of the steered wheel to change the rudder angle of the steered wheel; and a value of a control quantity having a minimum magnitude, among control quantities that cause a device for generating a braking/driving force for the vehicle to generate a braking/driving force.

In the above-described configuration, the magnitude of the target control quantity for the current cycle can be increasingly corrected to a value equal to or greater than at least either one of: a value that causes a device for changing a rudder angle of the steered wheel to change the rudder angle of the steered wheel; and a value that causes a device for generating a braking/driving force for the vehicle to generate a braking/driving force. Therefore, when the rudder angle of the steered wheels is controlled, the rudder angle of the steered wheels can be surely changed based on the increasingly corrected target control quantity by the device for changing the rudder angle of the steered wheels. Further, when the braking/driving force of the vehicle is controlled, the braking/driving force can be surely changed based on the increasingly corrected target control quantity by the device for generating the braking/driving force of the vehicle.

In particular, by increasingly correcting the magnitude of the target control quantity for the current cycle to the reference value, it is possible to prevent the magnitude of the target control quantity from increasing to the reference value or above. Therefore, it is possible to prevent the rudder angle of the steered wheels and/or the braking/driving force from being excessively changed.

Further, according to the present invention, in the above-described configuration, the number of cycles from the current cycle to the second cycle may be variably set according to a vehicle speed so as to increase as the vehicle speed is higher.

Generally, as the vehicle speed is higher, reductions in the performance of the automatic drive control (reductions in responsiveness that the driver senses) due to delay in the start of control of the rudder angle of the steered wheels and the braking/driving force of the vehicle are more remarkable. Therefore, it is preferable that, as the vehicle speed is higher, the rudder angle of the steered wheels and/or the braking/driving force of the vehicle is actually changed earlier, based on automatic drive control.

Further, in the present invention, the probability that the magnitude of the target control quantity increases to the reference value or above by the second cycle at the latest is determined based on the future target control quantities, that is, the target control quantities for the first cycle to the second cycle. Therefore, as the number of cycles from the current cycle to the second cycle is greater, it tends to be determined that, in a situation in which the magnitude of the target control quantity gradually increases, the probability is high that the magnitude of the target control quantity increases to the reference value or above by second cycle at the latest.

According to the above-described configuration, as the vehicle speed is higher, the number of cycles from the current cycle to the second cycle is greater. Therefore, in a situation in which the magnitude of the target control quantity gradually increases, as the vehicle speed is higher, it can be made more likely that the probability is determined to be high that the magnitude of the target control quantity increases to the reference value or above by the second cycle at the latest. Therefore, the tendency that reductions in the performance of automatic drive control due to the delay in stat of control of the rudder angle of the steered wheels and/or the braking/driving force of the vehicle becomes more remarkable as the vehicle speed is higher can be reduced.

DESCRIPTION OF EMBODIMENTS

The following explains preferable embodiments of the present invention in detail while referring to attached drawings.

First Embodiment

Figure 1:
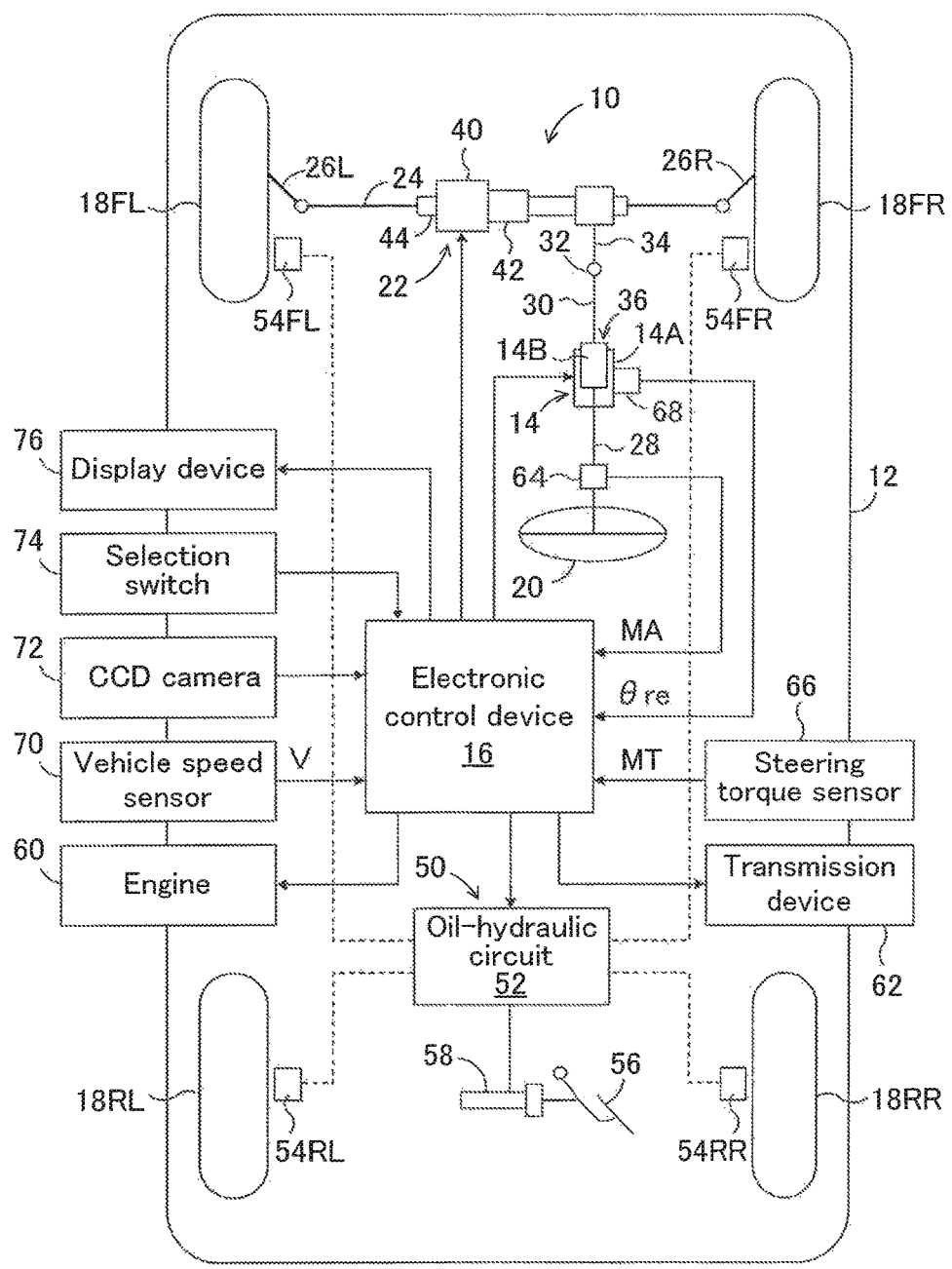
FIG. 1 illustrates an automatic drive control device that executes First Embodiment of an automatic drive control method according to the present invention.

FIG. 1 illustrates an automatic drive control device 10 that executes First Embodiment of an automatic drive control method according to the present invention. The automatic drive control device 10 is mounted on a vehicle 12, and includes a rudder angle varying device 14 and an electronic control device 16 that controls the rudder angle varying device 14. The vehicle 12 includes left and right front wheels 18FL and 18FR, which are steered wheels, and left and right rear wheels 18RL and 18RR, which are non-steered wheels. The front wheels 18FL and 18FR are turned by an electric power steering device (EPS) 22 driven in response to an operation of a steering wheel 20 by a driver, via a rack bar 24 and tie rods 26L and 26R.

The steering wheel 20 as a steering input device is connected to a pinion shaft 34 of the power steering device 22 via an upper steering shaft 28, the rudder angle varying device 14, a lower steering shaft 30, and a universal joint 32. The rudder angle varying device 14 includes a motor 36 for turning and driving. The motor 36 is linked to a lower end of the upper steering shaft 28 on a housing 14A side, and linked to an upper end of the lower steering shaft 30 on a rotor 14B side via a deceleration mechanism (not illustrated).

The rudder angle varying device 14 causes the upper steering shaft 28 and the lower steering shaft 30 to rotate relatively, thereby driving and turning the left and right front wheels 18FL and 18FR relatively with respect to the steering wheel 20. Thus, the rudder angle varying device 14 functions as a variable gear ratio steering device (VGRS) for changing the steering gear ratio (a reciprocal of a steering transmission ratio). Further, the rudder angle varying device 14 changes the rudder angle of the left and right front wheels irrespective of the presence/absence of a steering operation by the driver, thereby automatically steering the front wheels irrespective of the rotation position of the steering wheel 20. As is described below in detail, the rudder angle varying device 14 is controlled by a rudder angle control unit of the electronic control device 16.

In the embodiment illustrated, the EPS 22 is a rack-coaxial-type electric power steering device, and includes a motor 40, and, for example, a ball-screw-type conversion mechanism 42 for converting a rotation torque of the motor 40 into power in a direction of a reciprocating movement of the rack bar 24. The EPS 22 is controlled by an EPS control unit of the electronic control device 16. The EPS 22 generates an auxiliary steering force for driving the rack bar 24 relative to the housing 44, thereby functioning as a steering assist force generating device that reduces steering loads on the driver and assists operations of the rudder angle varying device 14.

It should be noted that the rudder angle varying device 14 and the steering assist force generating device may have any arbitrary configurations, as long as these devices can cooperate with each other to change the rudder angle of the left and right front wheels and to change of the rotation angle of the steering wheel 20, independently of a steering operation by a driver. The steering input device may be, not the steering wheel 20, but a joystick-type steering lever.

Braking forces for the wheels are controlled by controlling respective pressures in wheel cylinders 54FL, 54FR, 54RL, and 54RR, that is, brake pressures, by an oil-hydraulic circuit 52 of a braking device 50. Though not illustrated in FIG. 1, the oil-hydraulic circuit 52 includes an oil reservoir, an oil pump, various valve devices, and the like, and during normal driving, the brake pressure of each wheel cylinder is controlled by a master cylinder 58 that is driven in response to an operation by the driver of stepping on a brake pedal 56. Further, the brake pressure of each wheel cylinder is individually controlled by the oil-hydraulic circuit 52 controlled by the braking force control unit of the electronic control device 16 as required. The braking device 50 is capable of individually controlling the braking force of each wheel independently of the driver's braking operation.

Further, a driving force of driving wheels is controlled by control of an output of an engine 60 and a gear ratio of a transmission device 62 by a driving force control unit of the electronic control device 16. The driving force of the driving wheels is controlled according to a quantity of a driver's driving operation, for example, a quantity of a driver's operation of stepping on an accelerator pedal, which is not illustrated in FIG. 1, during normal driving. The vehicle may be any of a front-wheel-drive vehicle, a rear-wheel-drive vehicle, and a four-wheel-drive vehicle.

During automatic driving, the braking device 50, the engine 60, and the transmission device 62 are controlled independently of a driver's braking/driving operation so that the vehicle speed and the distance between the vehicle and a vehicle ahead are controlled, whereby the braking force of each wheel and the driving force of the driving wheels, that is, the overall braking/driving force of the vehicle, are automatically controlled.

The upper steering shaft 28 is provided with a steering angle sensor 64 that detects a rotation angle of the upper steering shaft as a steering angle MA. The pinion shaft 34 is provided with a steering torque sensor 66 that detects a steering torque MT. The rudder angle varying device 14 is provided with a rotation angle sensor 68 that detects a rotation angle of the lower steering shaft 30 with respect to the upper steering shaft 28 as a relative rotation angle $\theta re$. The steering angle sensor 64, the steering torque sensor 66, and the rotation angle sensor 68 detect a steering angle MA, a steering torque MT, and a relative rotation angle $\theta re$, respectively, which have positive values in the case where the vehicle is steered or turned in the left turn direction of the vehicle. It should be noted that a rotation angle of the lower steering shaft 30 may be detected, and the relative rotation angle $\theta re$ may be obtained as a difference between the steering angle MA and the rotation angle of the lower steering shaft 30.

A signal indicating the steering angle MA, a signal indicating the steering torque MT, and a signal indicating the relative rotation angle $\theta re$, together with a signal indicating a vehicle speed V detected by a vehicle speed sensor 70, are fed to the rudder angle control unit and the EPS control unit of the electronic control device 16. The EPS control unit of the electronic control device 16 controls the EPS 22 based on the steering torque MT and the like, so as to reduce steering loads on a driver, and at the same time, assist the control of the front wheel rudder angle by the rudder angle varying device 14 and the control of the rotation position of the steering wheel 20.

The vehicle 12 is provided with a CCD camera 72 for picking up a forward image of the vehicle and a selection switch 74 to be operated by an occupant of the vehicle. The selection switch 74 is used for selection regarding whether the vehicle is subjected to automatic driving or not. A signal indicating information of a forward image of the vehicle picked up by the CCD camera 72 and a signal indicating the position of the selection switch 74 are fed to a cruise control unit of the electronic control device 16. When the selection switch 74 is ON, automatic drive control is executed, which consists of automatic steering control for automatic steering of the front wheels, and automatic braking/driving force control for automatic control of the overall braking/driving force of the vehicle.

More specifically, as is described below in detail, trajectory control (also referred to as "LKA (lane keeping assist) control") for controlling the rudder angle of the left and right front wheels so that the vehicle travels along a traveling route is executed as automatic steering control. In trajectory control, a target rudder angle of the left and right front wheels for causing the vehicle to travel along a traveling route is calculated for each control cycle, and hence, a quantity of change of the target rudder angle for each control cycle is a target control quantity of trajectory control.

In particular, in the embodiment, the rudder angle of the left and right front wheels is achieved by control of the rotation angle of the pinion shaft 34. The target control quantity of trajectory control of the embodiment, therefore, is a target value of a quantity of change $\Delta\theta p$ of the rotation angle of the pinion shaft 34 for each control cycle, that is, a target control quantity $\Delta\theta pt$ of a pinion angle. The target control quantity $\Delta\theta pt$ is 0 when it is not necessary to change the rotation angle of the pinion shaft 34, and has a positive value or a negative value when it is necessary to rotate the pinion shaft 34 in the left turn direction or the right turn direction of the vehicle, respectively.

Further, as automatic braking/driving force control, automatic control of an overall braking/driving force of the vehicle is executed, so as to keep the vehicle speed constant, and to control the distance between the vehicle and a vehicle ahead to a predetermined distance. A target automatic drive control quantity for automatic braking/driving force control, therefore, is a target value of the overall braking/driving force of the vehicle, that is, a target braking/driving force. In this case, the target braking/driving force may be 0 when there is no requested overall braking/driving force of the vehicle, and the target braking/driving force may be a positive value or a negative value when the requested overall braking/driving force of the vehicle is a driving force or a braking force, respectively. It should be noted that the automatic braking/driving force control may be executed in an arbitrary manner; for example, the control may be executed in such a manner as described in the patent applications applied by the applicant of the present invention, such as JP10(1998)-44826A.

The CCD camera 72 is preferably a stereo camera that is capable of measuring a distance between the vehicle and an object ahead the vehicle, and forward image information of the vehicle and traveling route information may be acquired by means other than a CCD camera. Further, the distance between the vehicle and a vehicle ahead may be detected by means other than a CCD camera, such as a millimeter-wave radar.

Each of control units of the electronic control device 16 may include a CPU, a ROM, a RAM, and an input/output port device, and these may include microcomputers that are connected with one another by bidirectional common buses, or may have another configurations. The cruise control unit of the electronic control device 16 controls the rudder angle control unit, the EPS control unit, the braking force control unit, and the driving force control unit as required.

<Automatic Steering Control>

Figure 2:
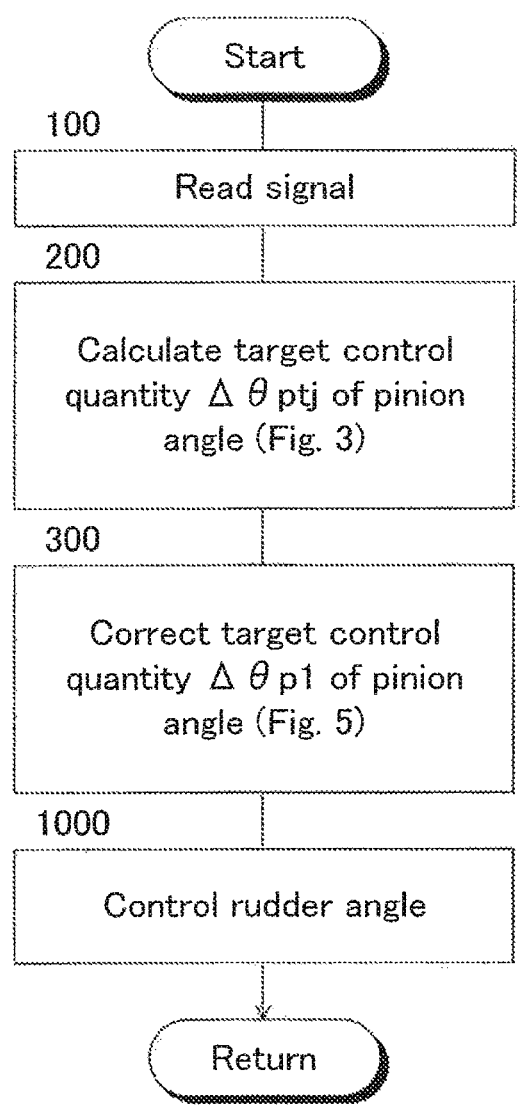
FIG. 2 is a flowchart illustrating a main routine of trajectory control as automatic steering control in the automatic drive control of First Embodiment.
Figure 3:
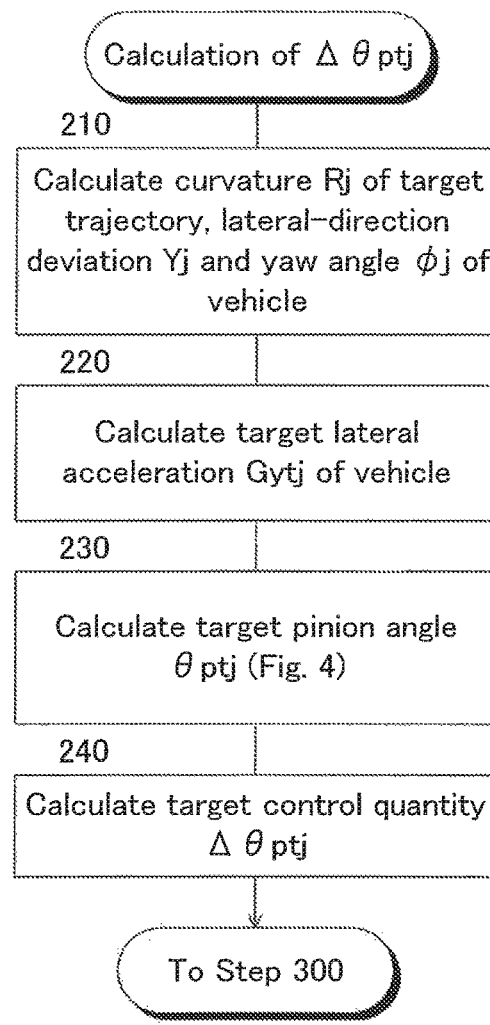
FIG. 3 is a flowchart illustrating a routine of calculating a target control quantity $\Delta\theta ptj$ of a pinion angle for trajectory control that is executed in Step 200 in FIG. 2.
Figure 5:
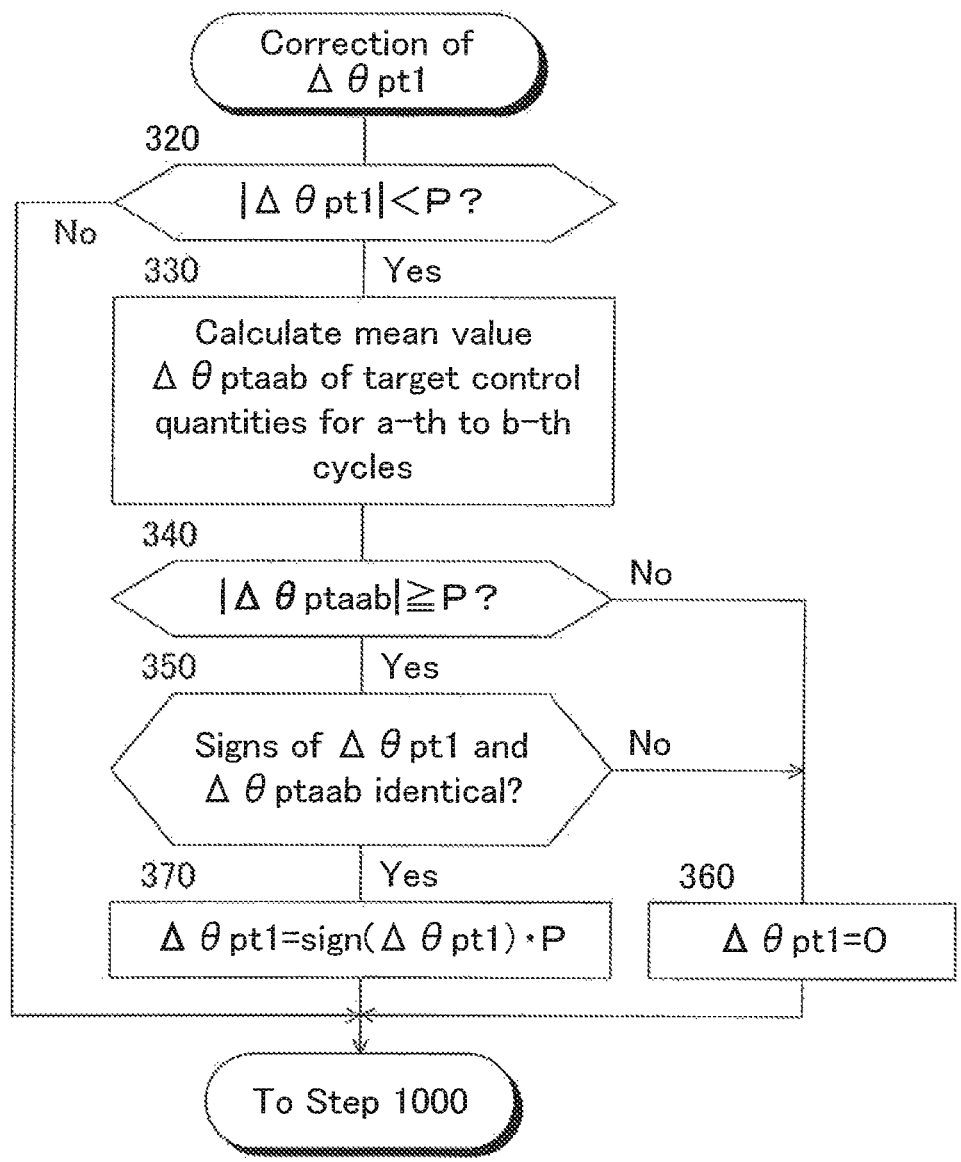
FIG. 5 is a flowchart illustrating a routine of correcting a target control quantity Δθpt1 that is executed in step 300 in FIG. 2.

FIG. 2 is a flowchart illustrating a main routine of automatic steering control in automatic drive control of First Embodiment, and FIGS. 3 and 5 are flowcharts illustrating subroutines of automatic steering control. It should be noted that automatic steering control according to the flowchart illustrated in FIG. 2 is executed repetitively for each predetermined period of time by the cruise control unit of the electronic control device 16, when the selection switch 74 is ON. In the following description, the automatic steering control according to the flowcharts illustrated in FIGS. 2, 3, and 5 is simply referred to as "control" as required.

<Main Routine of Automatic Steering Control> (FIG. 2)

First, in step 100, a signal indicating a steering angle MA detected by the steering angle sensor 64 and the like is read. In the next step 200, a target control quantity $\Delta\theta ptj$ of the pinion angle for trajectory control is calculated according to the flowchart illustrated in FIG. 3.

In step 300, a target control quantity $\Delta\theta pt1$ of the pinion angle for the current cycle is corrected as required according to the flowchart illustrated in FIG. 5, and the control proceeds to step 1000.

In step 1000, the rudder angle varying device 14 and the EPS 22 are controlled so that the pinion angle $\theta p$ is controlled with the target control quantity $\Delta\theta pt1$. This allows the rudder angle of the left and right front wheels to be controlled so that the vehicle travels along the traveling route.

It should be noted that, in step 1000, in the case where the magnitude of the target control quantity $\Delta\theta pt1$ after correction is less than a threshold value of a dead band of the trajectory control (a positive constant smaller than a reference value P described below), the control of the rudder angle of the front wheels for trajectory control based on the target control quantity $\Delta\theta pt1$ does not have to be executed.

<Routine of Calculating Target Control Quantity $\Delta\theta ptj$ of Pinion Angle> (FIG. 3)

First, in step 210, a target trajectory of the vehicle along the traveling route is decided by analyzing information of a forward image of the vehicle picked up by the CCD camera 72 and the like. Further, a curvature Rj (reciprocal of radius) of target trajectory, a deviation Yj of the vehicle in the lateral direction with respect to the target trajectory, and a yaw angle $\phi j$ of the vehicle from the current cycle (first cycle) to the c (positive certain integer)-th cycle are calculated (j=1 to c) by using, for example, a preliminarily set vehicle model.

It should be noted that the target trajectory of the vehicle may be decided based on information from a navigation device that is not illustrated, or may be decided based on combination of image information analysis and information from a navigation device. Further, the curvature Rj of the target trajectory and the like are parameters necessary for executing trajectory control for causing a vehicle to travel along a target trajectory, but since the calculations of the same are not the essence of the present invention, these parameters may be calculated in arbitrary manners.

In step 220, a target lateral acceleration Gytj (j=1 to c) for the current cycle to the c-th cycle is calculated as a target turning-state quantity of the vehicle that is necessary for causing the vehicle to travel along the target trajectory based on the parameter Rj of the trajectory control and the like. It should be noted that the target lateral acceleration Gytj may be calculated by a function of the parameter Rj and the like of the trajectory control. Alternatively, a map that indicates the relationship between the parameters of the trajectory control and the target lateral acceleration Gytj may be set, and the target lateral acceleration Gytj may be calculated according to the map based on the parameters of the trajectory control. Further, the target turning-state quantity of the vehicle may be, for example, a target yaw rate of the vehicle that is calculated by dividing the target lateral acceleration Gytj by the vehicle speed V.

Figure 4:
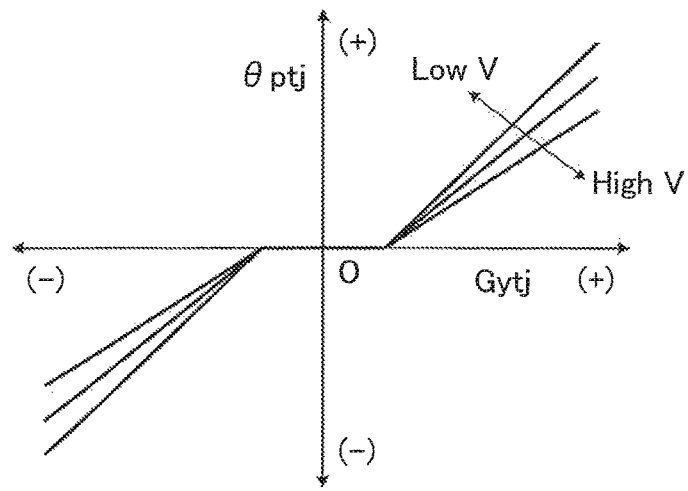
FIG. 4 illustrates a map for calculation of the target control quantity $\Delta\theta ptj$ of the pinion angle for trajectory control based on a target lateral acceleration $Gytj$ and a vehicle speed V.

In step 230, a target pinion angle $\theta ptj$ for trajectory control is calculated based on the target lateral acceleration Gytj of the vehicle and the vehicle speed V, referring to the map illustrated in FIG. 4. It should be noted that the configuration may be such that a vehicle speed Vj for the current cycle to the c-th cycle is estimated and the target pinion angle $\theta ptj$ is calculated based on the target lateral acceleration Gytj of the vehicle and the vehicle speed Vj.

In step 240, for each control cycle, a target control quantity $\Delta\theta ptj$ of the pinion angle is calculated as a difference between the target pinion angle $\theta ptj$ and a target pinion angle $\theta pt(j-1)$ of the preceding cycle. For the current cycle, the target pinion angle $\theta pt0$ of the preceding cycle may be the current pinion angle $\theta p$.

<Routine of Correcting Target Control Quantity $\Delta\theta ptj$ of Pinion Angle> (FIG. 5)

First, in step 320, it is determined whether the absolute value of the target control quantity $\Delta\theta pt1$ of the pinion angle for the current cycle is less than the reference value P that is preliminarily set. When the result of the determination is negative, correction is unnecessary for the target control quantity $\Delta\theta pt1$ for the current cycle. The control therefore proceeds to step 1000. In contrast, when the result of the determination is affirmative, the control proceeds to step 330.

It should be noted that the reference value P is the minimum value among control quantities that allow the pinion shaft 34 to rotate so as to change the rudder angle of the front wheels 18FL and 18FR even when friction resistances of the rudder angle varying device 14, the EPS 22, and the like vary in a preliminarily assumed temperature change range. However, if the minimum unit of control of the rotation angle of the pinion shaft 34 executed by the cruise control unit of the electronic control device 16 is assumed to be $\Delta\kappa plci$ (positive constant), then, the reference value P of the embodiment has a value that is an integer times the $\Delta\theta plci$.

In step 330, a mean value $\Delta\theta ptaab$ of target control quantities $\Delta\theta pta$ to $\Delta\theta ptb$ of the pinion angle for the a-th cycle as the first cycle to the b-th cycle as the second cycle is calculated. Here, "a" and "b" are positive constant integers of not less than 2 and not more than "c", and "b" is greater than "a". Further, "a" is preferably ½ of "b" or less than that, and "b-a" is preferably ⅓ of "c" or more than that. "b" and "c" may be identical to each other.

In step 340, it is determined whether the absolute value of the mean value $\Delta\theta ptaab$ is equal to or greater than the reference value P; that is, it is determined whether the probability is high that the magnitude of the target control quantity $\Delta\theta ptj$ of the pinion angle increases to or over the reference value P during a period from the current cycle to the b-th cycle. When the result of the determination is negative, it is not necessary to increase the magnitude of the target control quantity $\Delta\theta pt1$ of the current cycle, and the control therefore proceeds to step 360. In contrast, when the result of the determination is affirmative, the control proceeds to step 350.

In step 350, it is determined whether the sign of the target control quantity $\Delta\theta pt1$ for the current cycle and the sign of the mean value $\Delta\theta ptaab$ are identical. When the result of the determination is negative, then, in step 360, the target control quantity $\Delta\theta pt1$ of the pinion angle is corrected to 0. In contrast, when the result of the determination is affirmative, it is preferable that the magnitude of the target control quantity $\Delta\theta pt1$ increases. Therefore, in step 370, the target control quantity $\Delta\theta pt1$ is corrected to a product of the sign of the target control quantity $\Delta\theta pt1$, i.e., "sign($\Delta\theta pt1$)", and the reference value P, which is a product sign($\Delta\theta pt1$)·P.

In the case where the reference value P does not have a value that is an integer times the $\Delta\theta plci$, the magnitude of the target control quantity $\Delta\theta pt1$ of the pinion angle is preferably increasingly corrected to a value greater than the reference value P and smaller than P+$\Delta\theta plci$.

As is clear from the foregoing description, according to First Embodiment, it is determined whether the absolute value of the mean value Δθptaab of the target control quantities Δθpta to Δθptb of the pinion angle for the a-th cycle to the b-th cycle is equal to or greater than the reference value P. When the absolute value of the mean value Δθptaab is equal to or greater than the reference value P and the sign of the mean value Δθptaab is identical to the sign of the target control quantity Δθpt1 of the pinion angle for the current cycle, it is determined that the probability is high that the magnitude of the target control quantity Δθpt of the pinion angle would increase to the reference value P or above, by the b-th cycle, that is, by the c-th cycle.

Figure 6:
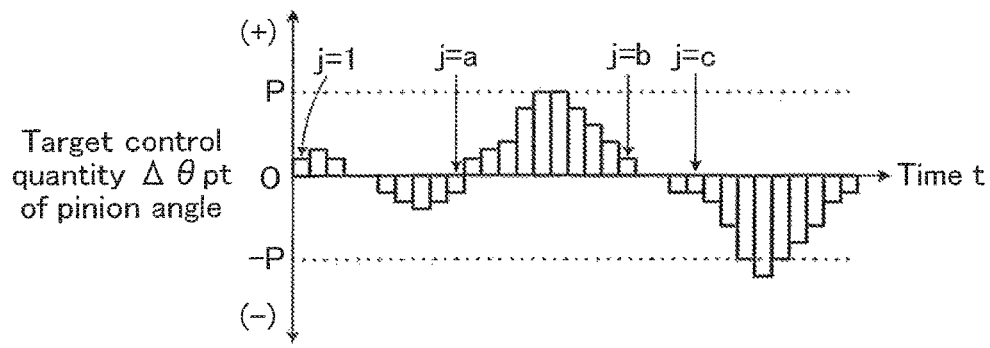
FIG. 6 illustrates an example in which the target control quantity Δθpt of the pinion angle repetitively changes for positive and negative.
Figure 7:
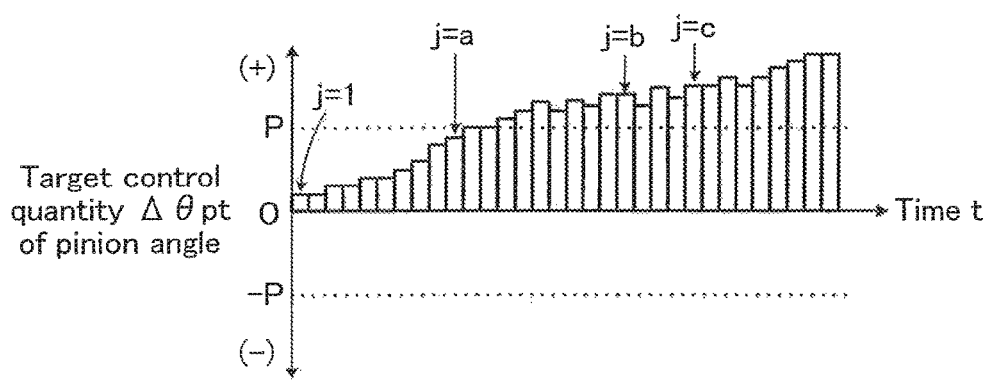
FIG. 7 illustrates an example in which the target control quantity Δθpt of the pinion angle, having a positive value, substantially and gradually increases.
Figure 8:
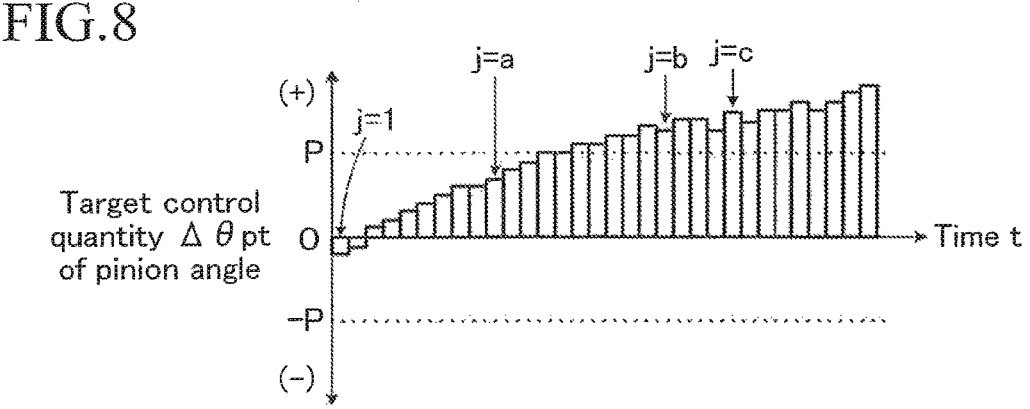
FIG. 8 illustrates an example in which the target control quantity Δθpt of the pinion angle changes from a negative value to a positive value, thereby substantially and gradually increasing.

Next, the following description specifically explains operations of First Embodiment, while referring to FIGS. 6 to 8. FIG. 6 illustrates an example in which the target control quantity Δθpt of the pinion angle repetitively changes for positive and negative. FIG. 7 illustrates an example in which the target control quantity Δθpt, having a positive value, substantially and gradually increases. FIG. 8 illustrates an example in which the target control quantity Δθpt changes from a negative value to a positive value, thereby substantially and gradually increasing.

In the case of the change illustrated in FIG. 6, when j=1, the result of the determination in step 320 is affirmative. Since, however, the absolute value of the mean value Δθptaab is not greater than the reference value P, the result of the determination in step 340 is negative. Therefore, the magnitude of the target control quantity Δθpt1 of the pinion angle is not increased, and the target control quantity Δθpt1 is corrected to 0 in step 360.

In the case of the change illustrated in FIG. 7, the absolute value of the mean value Δθptaab is equal to or greater than the reference value P. Therefore, when j=1, the results of the determinations in steps 320 and 340 are affirmative. Further, the sign of the mean value Δθptaab is positive, and is identical to the sign of the target control quantity Δθpt1 of the pinion angle for the current cycle. Therefore, the result of the determination in step 350 is also affirmative, resulting in that the target control quantity Δθpt1 of the pinion angle is increasingly corrected to P in step 370.

In the case of the change illustrated in FIG. 8, the absolute value of the mean value Δθptaab is equal to or greater than the reference value P. Therefore, when j=1, the results of the determinations in steps 320 and 340 are affirmative. The sign of the mean value Δθptaab, however, is positive, which is different from the sign (negative) of the target control quantity Δθpt1 of the pinion angle for the current cycle. Therefore, the result of the determination in step 350 is negative, and the target control quantity Δθpt1 of the pinion angle is corrected to 0 in step 360. Thus, the target control quantity Δθpt1 is corrected to neither P nor −P.

Figure 9:
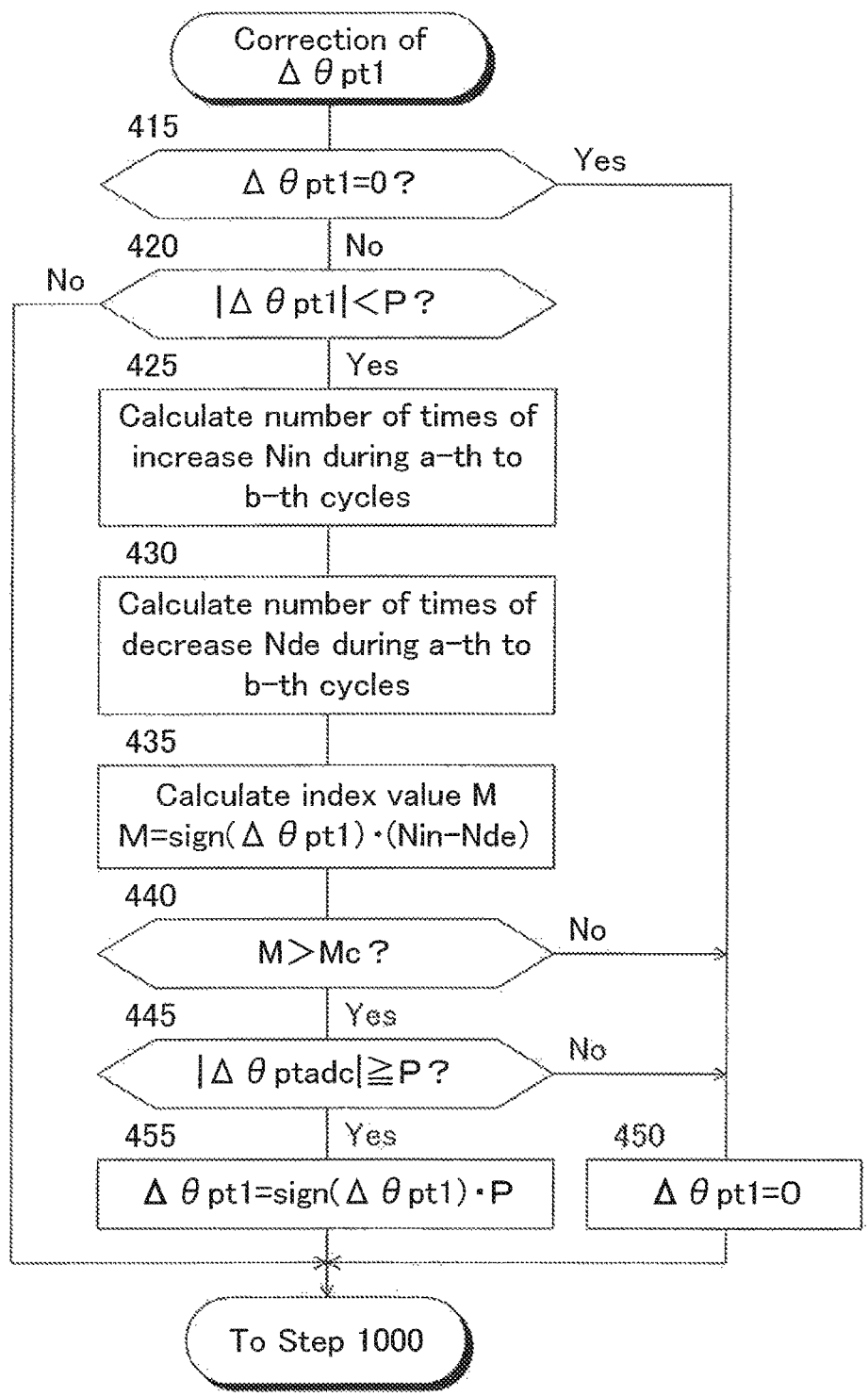
FIG. 9 is a flowchart illustrating a routine of correcting a target control quantity Δθpt1 that is executed in step 300 of the flowchart illustrated in FIG. 2, in Second Embodiment of the automatic drive control method according to the present invention.

[Second Embodiment] (FIG. 9)

In Second Embodiment, correction of the target control quantity Δθpt1 of the pinion angle in step 300 in the main routine of automatic steering control is executed according to the flowchart illustrated in FIG. 9. The steps other than step 300, i.e., steps 100, 200, and 1000, are executed in the same manners as those in First Embodiment mentioned above. Step 100, therefore, is executed according to the flowchart illustrated in FIG. 3. This is applicable to the other embodiments described below.

First, in step 415, it is determined whether the target control quantity Δθpt1 of the pinion angle for the current cycle is 0. When the result of the determination is affirmative, the control proceeds to step 450, and when the result of the determination is negative, the control proceeds to step 420.

In step 420, like in step 320 of First Embodiment, it is determined whether the absolute value of the target control quantity Δθpt1 of the pinion angle for the current cycle is less than the reference value P. When the result of the determination is negative, as correction is unnecessary for the target control quantity Δθpt1 for the current cycle, the control proceeds to step 1000. In contrast, when the result of the determination is affirmative, the control proceeds to step 425.

In step 425, the number of times Nin (the number of times of increase) when the sign of the target control quantity Δθptj of the pinion angle is identical to the sign thereof in the preceding cycle and the magnitude thereof has a value greater than the value thereof in the preceding cycle, during the period from the a-th cycle to the b-th cycle, is calculated.

In step 430, the number of times Nde (the number of times of decrease) when the sign of the target control quantity Δθptj of the pinion angle is identical to the sign thereof in the preceding cycle and the magnitude thereof has a value smaller than the value thereof in the preceding cycle, during the period from the a-th cycle to the b-th cycle, is calculated.

Here, as is the case with First Embodiment, "a" and "b" are positive constant integers of not less than 2 and not more than "c", and "b" is greater than "a". Further, "a" is preferably ½ of "b" or less than that, and "b-a" is preferably ⅓ of "c" or more than that. "b" and "c" may be identical to each other.

In step 435, an index value M that is used for determination regarding increase of the magnitude of the target control quantity Δθptj of the pinion angle is calculated according to the expression below (1).

$$M = \text{sign}(\Delta\theta pt1) \cdot (Nin - Nde) \quad (1)$$

In step 440, it is determined whether the index value M is greater than a reference value Mc (positive constant); that is, it is determined whether the magnitude of the target control quantity Δθptj of the pinion angle tends to increase. When the result of the determination is negative, the control proceeds to step 450, and when the result of the determination is affirmative, the control proceeds to step 445.

In step 445, "d" is assumed to be a positive constant integer between "a" and "c", and a mean value Δθptadc of target control quantities Δθptd to Δθptc of the pinion angle for the d-th cycle to the c-th cycle is calculated. Further, it is determined whether the absolute value of the mean value Δθptadc is equal to or more than the reference value P; that is, it is determined whether the probability is high that the magnitude of the target control quantity Δθptj of the pinion angle becomes equal to or greater than the reference value P by the c-th cycle. When the result of the determination is negative, the target control quantity Δθpt1 of the pinion angle is corrected to 0 in step 450. In contrast, when the result of the determination is affirmative, as it is preferable that the magnitude of the target control quantity Δθpt1 is increased, the target control quantity Δθpt1 is corrected in step 455 to a product of the sign "sign(Δθpt1)" of the target control quantity Δθpt1 and the reference value P, that is, a product "sign(Δθpt1)·P".

As is clear from the foregoing description, according to Second Embodiment, it is determined based on the index value M whether the magnitude of the target control quantity Δθptj of the pinion angle tends to increase in a section from the a-th cycle to the b-th cycle. Further, it is determined whether the absolute value of the mean value Δθptadc of the target control quantities of the pinion angle for the d-th cycle to the c-th cycle is equal to or greater than the reference value P. Then, when both of the results of the determinations are affirmative, it is determined that the probability is high that the magnitude of the target control quantity Δθptj of the pinion angle becomes equal to or greater than the reference value P by the c-th cycle.

Figure 10:
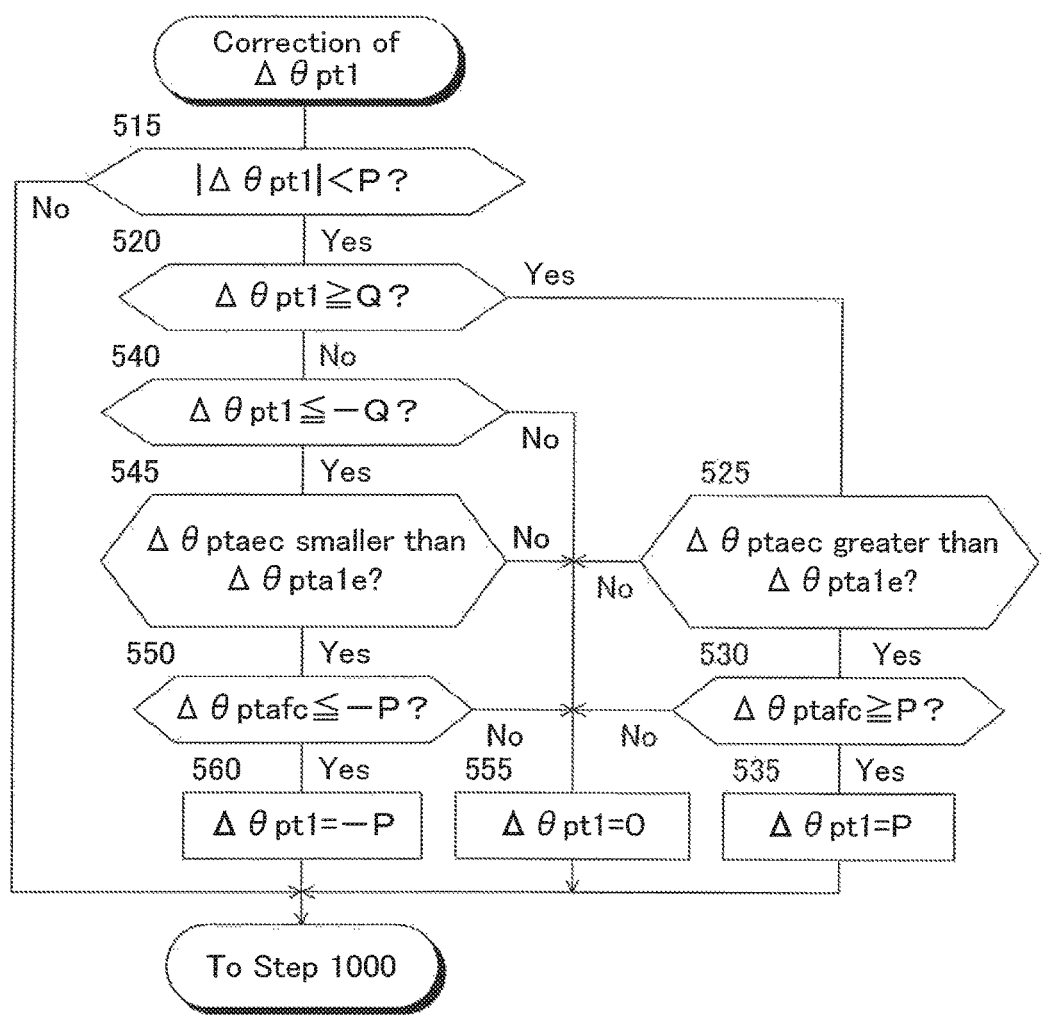
FIG. 10 is a flowchart illustrating a routine of correcting a target control quantity Δθpt1 that is executed in step 300 of the flowchart illustrated in FIG. 2, in Third Embodiment of the automatic drive control method according to the present invention.

[Third Embodiment] (FIG. 10)

Figure 12:
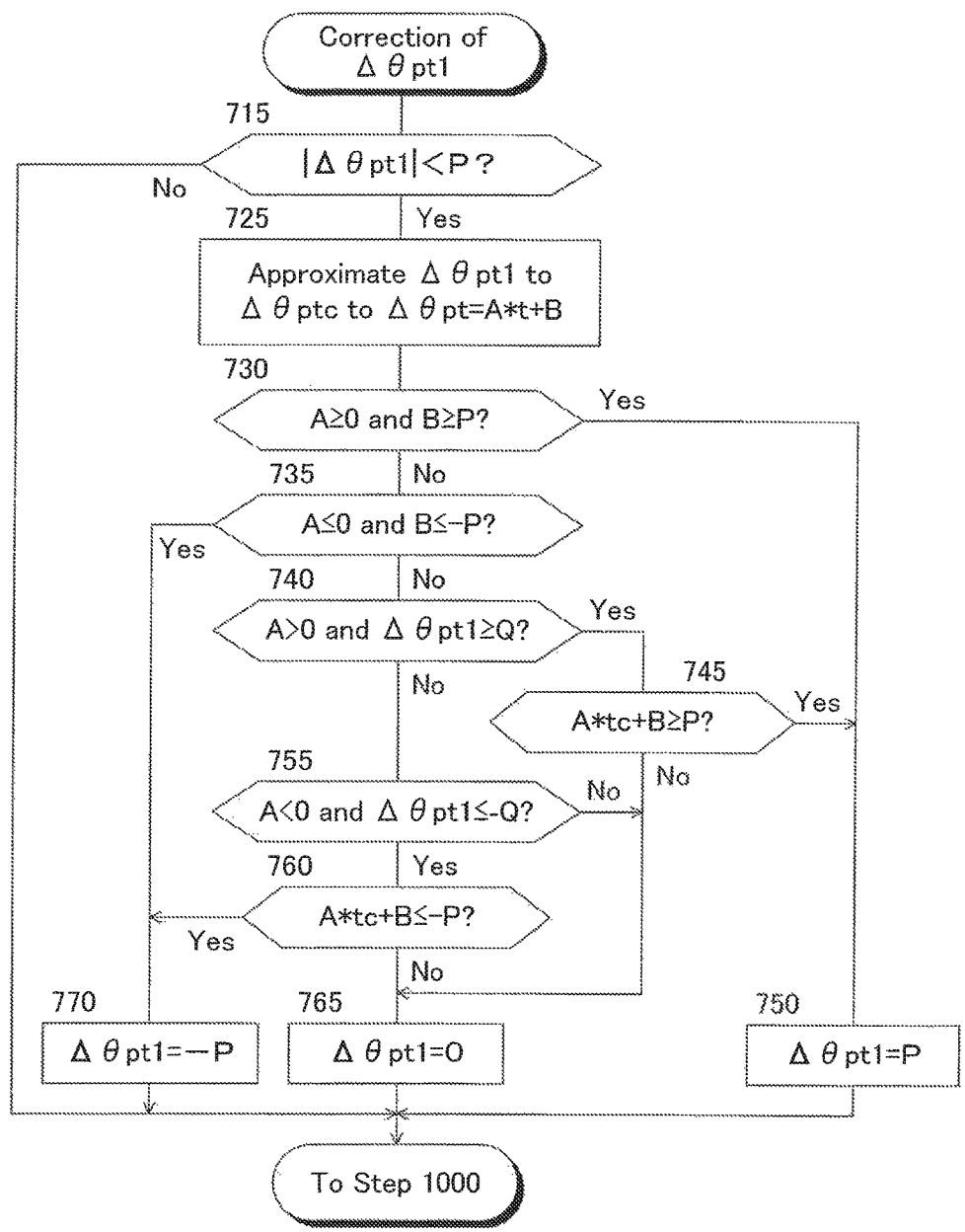
FIG. 12 is a flowchart illustrating a routine of correcting a target control quantity Δθpt1 that is executed in step 300 of the flowchart illustrated in FIG. 2, in Fifth Embodiment of the automatic drive control method according to the present invention.

In Third Embodiment, correction of the target control quantity Δθpt1 of the pinion angle in step 300 of the main routine of automatic steering control is executed according to the flowchart illustrated in FIG. 12.

Here, "a" and "c" in the flowchart illustrated in FIG. 12 may have values identical to those in First Embodiment. However, "c" is an even integer, and "e" is ½ of "c". Further, "f" is a positive constant integer that is greater than "a" and "e" and smaller than "c".

First, in step 515, as is the case with step 320 of First Embodiment, it is determined whether the absolute value of the target control quantity Δθpt1 of the pinion angle for the current cycle is less than the reference value P. When the result of the determination is negative, correction is unnecessary for the target control quantity Δθpt1 for the current cycle. The control therefore proceeds to step 1000. In contrast, when the result of the determination is affirmative, the control proceeds to step 520.

In step 520, it is determined whether the target control quantity Δθpt1 of the pinion angle for the current cycle is equal to or greater than a control permission reference value Q (a constant greater than 0 and smaller than P). When the result of the determination is negative, the control proceeds to step 540, and when the result of the determination is affirmative, the control proceeds to step 525. In the case where a dead band is set for the control of the pinion angle for trajectory control, the control permission reference value Q has a value equal to or slightly greater than a threshold value of the dead band. This applies to Fourth to Seventh Embodiments described below.

In step 525, a mean value Δθpta1e of target control quantities Δθpt1 to Δθpte of the pinion angle for the current cycle to the e-th cycle and a mean value Δθptaec of target control quantities Δθpte to Δθptc of the pinion angle for the e-th cycle to the c-th cycle are calculated. Further, it is determined whether the mean value Δθptaec is greater than the mean value Δθpta1e; that is, it is determined whether the target control quantity Δθptj of the pinion angle tends to increase. When the result of the determination is negative, the control proceeds to step 555, and when the result of the determination is affirmative, the control proceeds to step 530.

In step 530, a mean value Δθptafc of target control quantities Δθptf to Δθptc of the pinion angle for the f-th cycle to the c-th cycle is calculated. Further, it is determined whether the mean value Δθptafc is equal to or greater than the reference value P; that is, it is determined whether the probability is high that the target control quantity Δθptj of the pinion angle becomes equal to or greater than the reference value P during a period from the f-th cycle to the c-th cycle at the latest. When the result of the determination is negative, the control proceeds to step 555, and when the result of the determination is affirmative, the target control quantity Δθpt1 of the pinion angle for the current cycle is corrected to P in step 535.

In step 540, it is determined whether the target control quantity Δθpt1 of the pinion angle for the current cycle is equal to or less than Q. When the result of the determination is negative, correction by increasing is unnecessary for the magnitude of the target control quantity Δθpt1. The control therefore proceeds to step 555. When the result of the determination is affirmative, the control proceeds to step 545.

In step 545, a mean value Δθpta1e of target control quantities Δθpt1 to Δθpte of the pinion angle for the current cycle to the e-th cycle, and a mean value Δθptaec of target control quantities Δθpte to Δθptc of the pinion angle for the e-th cycle to the c-th cycle, are calculated. Further, it is determined whether the mean value Δθptaec is smaller than the mean value Δθpta1e; that is, it is determined whether the target control quantity Δθptj of the pinion angle tends to decrease. When the result of the determination is negative, the control proceeds to step 555, and when the result of the determination is affirmative, the control proceeds to step 550.

In step 550, a mean value Δθptafc of target control quantities Δθptf to Δθptc of the pinion angle for the f-th cycle to the c-th cycle is calculated. Further, it is determined whether the mean value Δθptafc is equal to or less than −P; that is, it is determined whether the probability is high that the target control quantity Δθptj of the pinion angle becomes equal to or less than −P during a period from the f-th cycle to the c-th cycle at the latest. When the result of the determination is negative, the target control quantity Δθpt1 of the pinion angle for the current cycle is corrected to 0 in step 555. When the result of the determination is affirmative, the target control quantity Δθpt1 is corrected to −P in step 560.

As is clear from the foregoing description, according to Third Embodiment, it is determined whether the magnitude of the target control quantity Δθptj tends to increase, based on the magnitude relationship between mean values of target control quantities Δθptj of the pinion angle in the first half and the last half of a section from the a-th cycle to the c-th cycle. Further, it is determined whether the absolute value of the mean value Δθptafc of the target control quantities Δθptj from the f-th cycle to the c-th cycle is equal to or more than the reference value P. When both of the results of the determinations are affirmative, it is determined that the probability is high that the magnitude of the target control quantity Δθptj becomes equal to or more than the reference value P by the c-th cycle.

It should be noted that the configuration may be modified as follows: in the case where step 515 is omitted and the results of the determinations in steps 520 and 540 are negative, the magnitude of the target control quantity Δθptj is less than the control permission reference value Q, and hence, the control proceeds to step 1000.

In First to Third Embodiments mentioned above, target control quantities Δθpt1 to Δθptc of the pinion angle for the current cycle to the c-th cycle are calculated. Since, however, the estimation of change of Δθptj is executed by using the target control quantity Δθpt1 of the pinion angle for the current cycle and the target control quantities Δθpta to Δθptc for the a-th cycle to the c-th cycle, the configuration may be modified so that only these target control quantities Δθpt1 and Δθpta to Δθptc are calculated.

Figure 11:
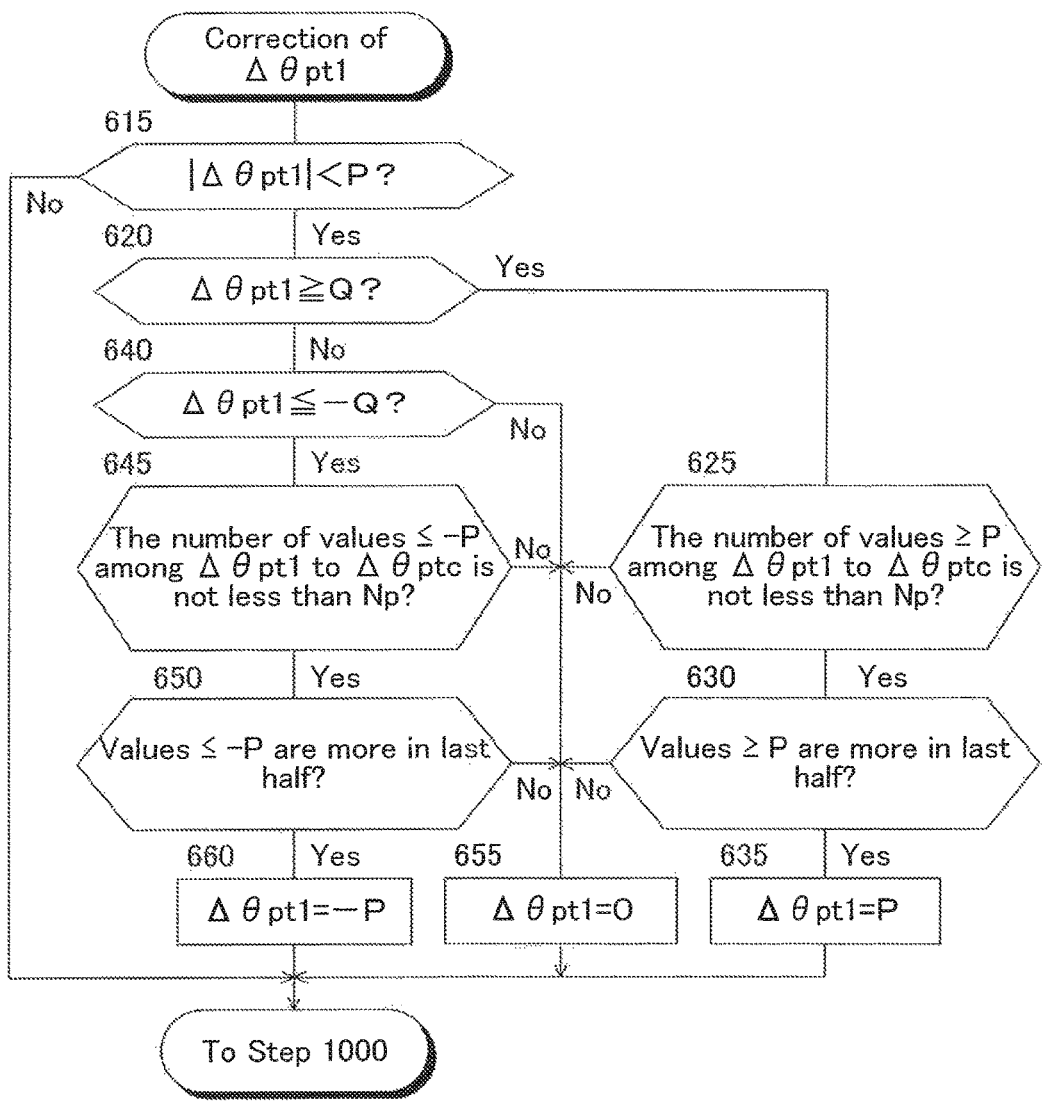
FIG. 11 is a flowchart illustrating a routine of correcting a target control quantity Δθpt1 that is executed in step 300 of the flowchart illustrated in FIG. 2, in Fourth Embodiment of the automatic drive control method according to the present invention.

[Fourth Embodiment] (FIG. 11)

In Fourth Embodiment, correction of the target control quantity Δθpt1 of the pinion angle in step 300 of the main routine of automatic steering control is executed according to the flowchart illustrated in FIG. 11. "a" and "c" in the flowchart illustrated in FIG. 11 may have the same values as those in First Embodiment.

Steps 615 and 620 in the flowchart illustrated in FIG. 11 are executed in the same manners as those of steps 515 and 520 in Third Embodiment, respectively. When the result of the determination in step 620 is negative, the control proceeds to step 640, and when the result of the determination therein is affirmative, the control proceeds to step 625.

In step 625, it is determined whether the number of values equal to or greater than the reference value P among the target control quantities $\Delta\theta pt1$ to $\Delta\theta ptc$ of the pinion angle for the current cycle to the c-th cycle is equal to or greater than Np (positive constant integer). When the result of the determination is negative, the control proceeds to step 655, and when the result of the determination is affirmative, the control proceeds to step 630.

In step 630, it is determined whether, regarding the number of values equal to or greater than the reference value P among the values of the target control quantities $\Delta\theta pt1$ to $\Delta\theta ptc$, the number of such values is greater in the last half than in the first half of the section from the current cycle to the c-th cycle. For example, regarding the number of values equal to or greater than the reference value P among the values of the target control quantities $\Delta\theta ptj$, the numbers Npf and Npl of such values in the first half and the last half of the section from the current cycle to the c-th cycle are obtained, respectively, and it is determined whether Npl is greater than Npf. When the result of the determination is negative, the control proceeds to step 655, and when the result of the determination is affirmative, the target control quantity $\Delta\theta pt1$ of the pinion angle for the current cycle is corrected to P in step 635.

Step 640 is executed in the same manner as that of step 540 in Third Embodiment. When the result of the determination in step 640 is negative, the control proceeds to step 655, and when the result of the determination therein is affirmative, the control proceeds to step 645.

In step 645, it is determined whether, among the values of the target control quantity $\Delta\theta pt1$ to $\Delta\theta ptc$ of the pinion angle for the current cycle to the c-th cycle, the number of the values equal to or less than –P is equal to or more than Np. When the result of the determination is negative, the control proceeds to step 655, and when the result of the determination is affirmative, the control proceeds to step 650.

In step 650, it is determined whether, regarding the number of values equal to or less than –P among the values of the target control quantities $\Delta\theta pt1$ to $\Delta\theta ptc$, the number of such values is greater in the last half than in the first half of the section from the current cycle to the c-th cycle. For example, regarding the number of values equal to or less than –P among the values of the target control quantities $\Delta\theta ptj$, the numbers Nnf and Nns of such values in the first half and the last half of the section from the current cycle to the c-th cycle are obtained, respectively, and it is determined whether Nns is greater than Nnf. When the result of the determination is negative, the target control quantity $\Delta\theta pt1$ of the pinion angle for the current cycle is corrected to 0 in step 655, and when the result of the determination is affirmative, the target control quantity $\Delta\theta pt1$ is corrected to –P in step 660.

As is clear from the foregoing description, according to Fourth Embodiment, it is determined whether the number of times when the magnitude of the target control quantity $\Delta\theta ptj$ of the pinion angle becomes equal to or greater than the reference value P in a section from the current cycle to the c-th cycle is equal to or greater than a reference value. Further, it is determined whether the magnitude of the target control quantity $\Delta\theta ptj$ becomes equal to or greater than the reference value P more frequently in the last half of the above-described section. When both of the results of the determinations are affirmative, it is determined that the probability is high that the magnitude of the target control quantity $\Delta\theta ptj$ becomes equal to or greater than the reference value P by the c-th cycle.

It should be noted that, in this embodiment as well, the configuration may be modified as follows: in the case where step 615 is omitted and the results of the determinations in steps 620 and 640 are negative, the control proceeds to step 1000.

[Fifth Embodiment] (FIG. 12)

In Fifth Embodiment, correction of the target control quantity $\Delta\theta pt1$ of the pinion angle in step 300 of the main routine of automatic steering control is executed according to the flowchart illustrated in FIG. 12.

Step 715 in the flowchart illustrated in FIG. 12 is executed in the same manner as that of step 515 in Third Embodiment. When the result of the determination in step 715 is negative, the control proceeds to step 1000, and when the result of the determination therein is affirmative, the control proceeds to step 725.

In step 725, for example, by a statistical method, a coefficient A and a constant B for approximating the target control quantities $\Delta\theta pt1$ to $\Delta\theta ptc$ of the pinion angle for the current cycle to the c-th cycle to the expression (2) shown below, which is a linear expression of a function regarding the time t. When, however, the target control quantities $\Delta\theta pt1$ to $\Delta\theta ptc$ cannot be approximated to the linear expression (2) shown below, both of the coefficient A and the constant B are set to 0.

$$\Delta\theta pt = A*t + B \qquad (2)$$

In step 730, it is determined whether the coefficient A is equal to or more than 0, and the constant B is equal to or more than the reference value P; that is, it is determined whether substantially all of the target control quantities $\Delta\theta pt1$ to $\Delta\theta ptc$ are equal to or more than the reference value P. When the result of the determination is affirmative, the control proceeds to step 750, and when the result of the determination is negative, the control proceeds to step 735.

In step 735, it is determined whether the coefficient A is equal to or less than 0, and the constant B is equal to or less than the reference value –P; that is, it is determined whether substantially all of the target control quantities $\Delta\theta pt1$ to $\Delta\theta ptc$ are equal to or less than the reference value –P. When the result of the determination is affirmative, the control proceeds to step 770, and when the result of the determination is negative, the control proceeds to step 740.

In step 740, it is determined whether the coefficient A is positive and the target control quantity $\Delta\theta pt1$ of the current cycle is equal to or more than the control permission reference value Q; that is, it is determined whether the target control quantities $\Delta\theta pt1$ to $\Delta\theta ptc$ as a whole increase to values equal to or more than Q. When the result of the determination is negative, the control proceeds to step 755, and when the result of the determination is affirmative, the control proceeds to step 745.

In step 745, an elapsed time from the current cycle to the c-th cycle is assumed to be "tc", and tc is substituted in t in the right side of the above-described expression (2), whereby the value $\Delta\theta pt(tc) = A*tc + B$ of the approximation expression of the above-described expression (2) for the c-th cycle is calculated. Further, it is determined whether the value A*tc+B is equal to or greater than the reference value P; that is, it is determined whether the probability is high that the target control quantity Δθptj becomes equal to or greater than the reference value P by the c-th cycle. When the result of the determination is negative, the control proceeds to step 765. When the result of the determination is affirmative, the magnitude of the target control quantity Δθpt1 of the pinion angle for the current cycle is preferably increased. In step 750, therefore, the target control quantity Δθpt1 is corrected to P.

In step 755, it is determined whether the coefficient A is negative and the target control quantity Δθpt1 of the current cycle is equal to or less than −Q; that is, it is determined whether the target control quantities Δθpt1 to Δθptc as a whole decrease to values equal to or less than −Q. When the result of the determination is negative, the control proceeds to step 765, and when the result of the determination is affirmative, the control proceeds to step 760.

In step 760, as is the case with step 745, the value Δθpt(tc)=A*tc+B of the approximation expression of the above-described expression (2) for the c-th cycle is calculated. Further, it is determined whether the value A*tc+B is equal to or less than the reference value −P; that is, it is determined whether the probability is high that the target control quantity Δθptj becomes equal to or less than the reference value −P by the c-th cycle. When the result of the determination is negative, the target control quantity Δθpt1 of the pinion angle for the current cycle is corrected to 0 in step 765. In contrast, when the result of the determination is affirmative, the magnitude of the target control quantity Δθpt1 is preferably increased. In step 770, therefore, the target control quantity Δθpt1 is corrected to −P.

As is clear from the foregoing description, according to Fifth Embodiment, the target control quantities Δθpt1 to Δθptc of the pinion angle for the current cycle to the c-th cycle are approximated to the linear expression (2), and it is determined based on the linear expression whether the situation is such that the magnitude of the target control quantity Δθptj gradually increases. Further, it is determined whether the magnitude of the target control quantity Δθptc in the c-th cycle is equal to or more than the reference value P. When both of the results of the determinations are affirmative, it is determined that the probability is high that the magnitude of the target control quantity Δptj becomes equal to or more than the reference value P by the c-th cycle.

It should be noted that in step 745, it is determined whether the value A*tc+B of the approximation expression of the above-described expression (2) for the c-th cycle is equal to or more than the reference value P. The configuration, however, may be modified so that "g" is set to be a positive integer smaller than "c" and close to "c", the elapsed time from the current cycle to the g-th cycle is assumed to be "tg", and it is determined whether the value A*tg+B of the approximation expression of the above-described expression (2) for the g-th cycle is equal to or more than the reference value P.

Likewise, in step 760, it is determined whether the value A*tc+B of the approximation expression of the above-described expression (2) for the c-th cycle is equal to or less than the reference value −P. The configuration, however, may be modified so that it is determined whether the value A*tg+B of the approximation expression of the above-described expression (2) for the g-th cycle is equal to or less than the reference value −P.

Figure 13:
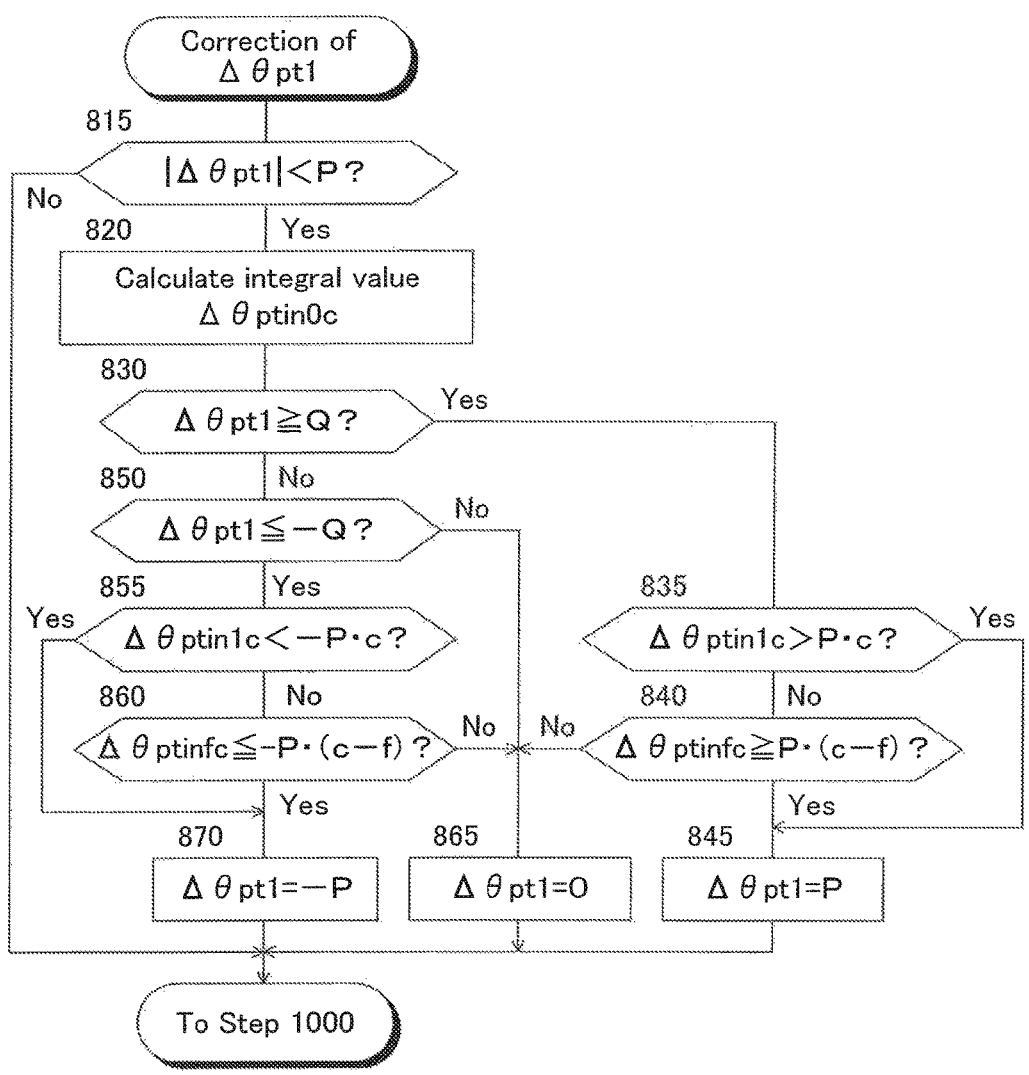
FIG. 13 is a flowchart illustrating a routine of correcting a target control quantity Δθpt1 that is executed in step 300 of the flowchart illustrated in FIG. 2, in Sixth Embodiment of the automatic drive control method according to the present invention.

[Sixth Embodiment] (FIG. 13)

In Sixth Embodiment, correction of the target control quantity Δθpt1 of the pinion angle in step 300 in the main routine of automatic steering control is executed according to the flowchart illustrated in FIG. 13. It should be noted that "f" in the flowchart illustrated in FIG. 13 may have the same value as that in Third Embodiment. In other words, "f" is a positive constant integer greater than ½ of "c" and smaller than "c".

Step 815 in the flowchart illustrated in FIG. 13 is executed in the same manner as that of step 515 in Third Embodiment. When the result of the determination in step 815 is negative, the control proceeds to step 1000, and when the result of the determination therein is affirmative, the control proceeds to step 820.

In step 820, a value Δθptin1c obtained by integrating the target control quantities Δθpt1 to Δθptc of the pinion angle for the current cycle to the c-th cycle, that is, the total sum of the target control quantities Δθpt1 to Δθptc is calculated.

In step 830, it is determined whether the target control quantity Δθpt1 of the pinion angle for the current cycle is equal to or more than the control permission reference value Q. When the result of the determination is negative, the control proceeds to step 850, and when the result of the determination is affirmative, the control proceeds to step 835.

In step 835, it is determined whether the integral value Δθptin1c is greater than the product of the reference value P and c; that is, it is determined whether the mean value of the target control quantities Δθpt1 to Δθptc is equal to or more than the reference value P. When the result of the determination is affirmative, the control proceeds to step 845, and when the result of the determination is negative, the control proceeds to step 840.

In step 840, the integral value Δθtinfc of the target control quantities Δθptf to Δθptc of the pinion angle for the f-th cycle to the c-th cycle, that is, the total sum of the target control quantities Δθptf to Δθptc is calculated. Further, it is determined whether the integral value Δθptinfc is equal to or more than the product of the reference value P and (c-f); that is, it is determined whether substantially all of the target control quantities Δθptf to Δθptc for the f-th cycle to the c-th cycle are equal to or more than the reference value P. When the result of the determination is negative, the control proceeds to step 865. When the result of the determination is affirmative, the magnitude of the target control quantity Δθpt1 of the pinion angle for the current cycle is preferably increased. Therefore, in step 845, the target control quantity Δθpt1 is corrected to P.

In step 850, it is determined whether the target control quantity Δθpt1 of the pinion angle for the current cycle is equal to or less than −Q. When the result of the determination is negative, the control proceeds to step 865, and when the result of the determination is affirmative, the control proceeds to step 855.

In step 855, it is determined whether the integral value Δθptin1c is smaller than the product −P·c of the reference value P and −c, that is, it is determined whether the mean value of the target control quantities Δθpt1 to Δθptc is equal to or less than the reference value −P. When the result of the determination is affirmative, the control proceeds to step 870, and when the result of the determination is negative, the control proceeds to step 860.

In step 860, as is the case with step 840, an integral value Δθptinfc of target control quantities Δθptf to Δθptc of the pinion angle for the f-th cycle to the c-th cycle is calculated. Further, it is determined whether the integral value Δθptinfc is equal to or less than −P(c−f); that is, it is determined whether the mean value of the target control quantities Δθptf to Δθptc for the f-th cycle to the c-th cycle is equal to or less than the reference value −P. When the result of the determination is negative, the target pinion angle θpt is corrected to 0 in step 865. In contrast, when the result of the determination is affirmative, the magnitude of the target control quantity Δθpt1 of the pinion angle for the current cycle is preferably increased. In step 870, therefore, the target control quantity Δθpt1 is corrected to −P.

As is clear from the foregoing description, according to Sixth Embodiment, it is determined whether the magnitude of the mean value of the target control quantities Δθpt1 to Δθptc of the pinion angle for the current cycle to the c-th cycle is equal to or more than the reference value P. Further, it is determined whether the magnitude of the mean value of the target control quantities Δθptf to Δθptc of the pinion angle for the f-th cycle to the c-th cycle is equal to or more than the reference value P. When both of the results of the determinations are affirmative, it is determined that the probability is high that the magnitude of the target control quantity Δθptj becomes equal to or more than the reference value P by the c-th cycle.

Figure 14:
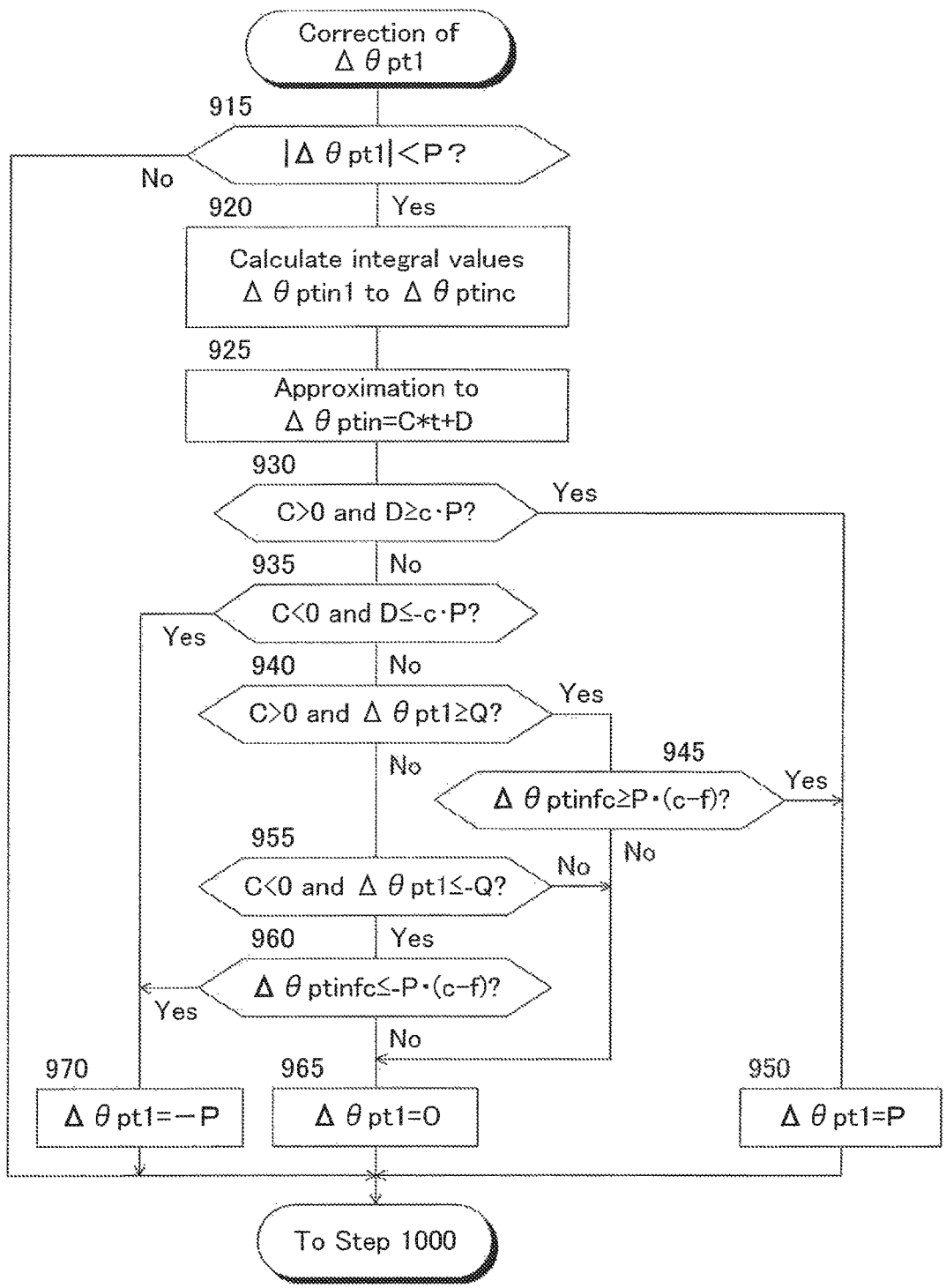
FIG. 14 is a flowchart illustrating a routine of correcting a target control quantity Δθpt1 that is executed in step 300 of the flowchart illustrated in FIG. 2, in Seventh Embodiment of the automatic drive control method according to the present invention.

[Seventh Embodiment] (FIG. 14)

In Seventh Embodiment, correction of the target control quantity Δθpt1 of the pinion angle in step 300 in the main routine of automatic steering control is executed according to the flowchart illustrated in FIG. 14.

Step 915 in the flowchart illustrated in FIG. 14 is executed in the same manner as that of step 515 in Third Embodiment. When the result of the determination in step 915 is negative, the control proceeds to step 1000, and when the result of the determination therein is affirmative, the control proceeds to step 920.

In step 920, for each cycle, target control quantities Δθptj of the pinion angle for the current cycle to the cycle concerned are integrated, whereby integral values Δθptin1 to Δθptinc are obtained for each cycle, respectively; in other words, for each cycle, the total sums of the target control quantities Δθptj for the current cycle to the cycle concerned are calculated.

In step 925, for example, by a statistical method, a coefficient C and a constant D for approximating the integral values Δθptin1 to Δθptinc to the expression (3) shown below, which is a linear expression of a function regarding the time t. When, however, the integral values Δθptin1 to Δθptinc cannot be approximated to the linear expression (3) shown below, both of the coefficient C and the constant D are set to 0.

$$\Delta\theta ptin = C^*t + D \quad (3)$$

In step 930, it is determined whether the coefficient C is positive and the constant D is equal to or greater than the product c·P, which is the product of c and the reference value P; that is, it is determined whether the integral values Δθptin1 to Δθptinc are substantially equal to or more than c·P and are in a gradual increase situation. When the result of the determination is affirmative, the control proceeds to step 950, and when the result of the determination is negative, the control proceeds to step 935.

In step 935, it is determined whether the coefficient C is negative and the constant D is equal to or less than the reference value −c·P; that is, it is determined whether the integral values Δθptin1 to Δθptinc are substantially equal to or less than −c·P and are in a gradual decrease situation. When the result of the determination is affirmative, the control proceeds to step 970, and when the result of the determination is negative, the control proceeds to step 940.

In step 940, it is determined whether the coefficient C is positive and the target control quantity Δθpt1 for the current cycle is equal or more than Q; that is, it is determined whether the target control quantities Δθpt1 to Δθptc have values equal to or more than Q and are in a gradual increase situation as a whole. When the result of the determination is negative, the control proceeds to step 955, and when the result of the determination is affirmative, the control proceeds to step 945.

In step 945, as is the case with step 840 in Sixth Embodiment, the integral value Δθptinfc of the target control quantities Δθptf to Δθptc of the pinion angle for the f-th cycle to the c-th cycle is calculated. Further, it is determined whether the integral value Δθptinfc is equal to or more than the product of the reference value P and (c−f); that is, it is determined whether substantially all of the target control quantities Δθptf to Δθptc for the f-th cycle to the c-th cycle are equal to or more than the reference value P. When the result of the determination is negative, the control proceeds to step 965. When the result of the determination is affirmative, the magnitude of the target control quantity Δθpt1 of the pinion angle for the current cycle is preferably increased. Therefore, in step 950, the target control quantity Δθpt1 is corrected to P.

In step 955, it is determined whether the coefficient C is negative and the target control quantity Δθpt1 for the current cycle is equal to or less than −Q; that is, it is determined whether the target control quantities Δθpt1 to Δθptc are equal to or less than −Q and are in a gradual decrease situation as a whole. When the result of the determination is negative, the control proceeds to step 965, and when the result of the determination is affirmative, the control proceeds to step 960.

In step 960, as is the case with step 860 in Sixth Embodiment, an integral value Δθptinfc of target control quantities Δθptf to Δθptc of the pinion angle for the f-th cycle to the c-th cycle is calculated. Further, it is determined whether the integral value Δθptinfc is equal to or less than the product of the reference value P and −(c−f); that is, it is determined whether substantially all of the target control quantities Δθptf to Δθptc for the f-th cycle to the c-th cycle are equal to or smaller than the reference value −P. When the result of the determination is negative, the target pinion angle θpt is corrected to 0 in step 965. In contrast, when the result of the determination is affirmative, the magnitude of the target control quantity Δθpt1 of the pinion angle for the current cycle is preferably increased. Therefore, in step 970, the target control quantity Δθpt1 is corrected to P.

As is clear from the foregoing description, according to Seventh Embodiment, the integral values Δθptin1 to Δθptinc of the target control quantities Δθptj of the pinion angle for the current cycle to the c-th cycle are calculated. Then, these integral values are approximated to the linear expression (3), and it is determined based on the linear expression whether the magnitude of the target control quantity Δθptj is in a gradual increase situation. Further, it is determined whether the magnitude of the mean value of the target control quantities Δθptf to Δθptc for the f-th cycle to the c-th cycle is equal to or more than the reference value P. When both of the results of the determinations are affirmative, it is determined that the probability is high that the magnitude of the target control quantity Δθptj becomes equal to or more than the reference value P by the c-th cycle.

According to each embodiment described above, the target control quantities Δθpt1 to Δθptc of the pinion angle for the current cycle to the c-th cycle are calculated, and in the case where the magnitude of the target control quantity Δθpt1 for the current cycle is less than the reference value P, change of the target control quantity Δθptj is estimated. Further, when it is determined that the probability is high that the target control quantity Δθptj has a sign identical to that for the current cycle and the magnitude thereof increases to the reference value P or above by the c-th cycle, the magnitude of the target control quantity Δθpt1 for the current cycle is increasingly corrected to the reference value P.

Figure 15:
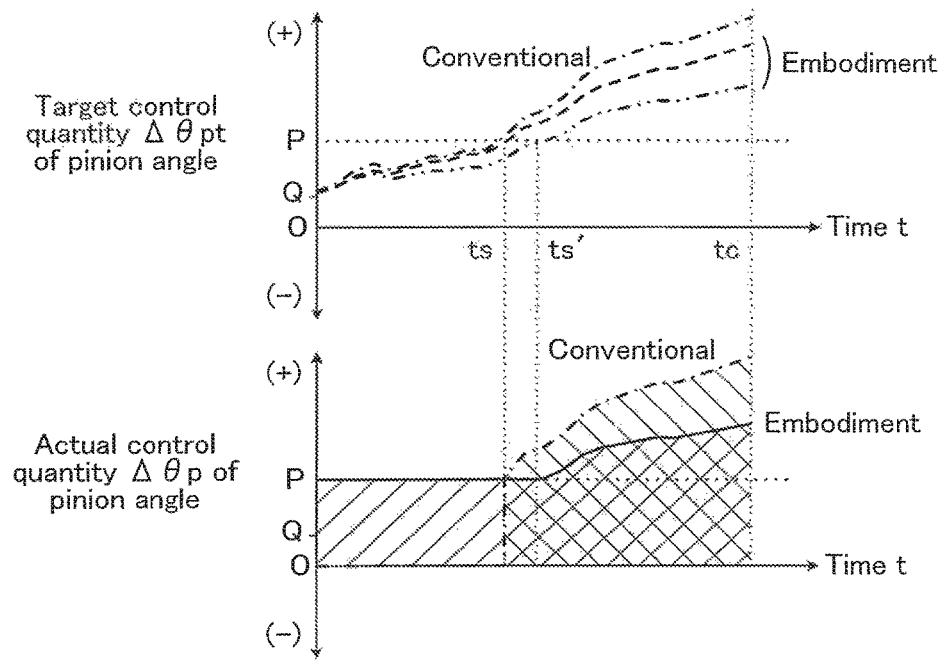
FIG. 15 illustrates exemplary changes of a target control quantity Δθpt of a pinion angle (upper part) and changes of an actual control quantity (control output) Δθp of the pinion angle (lower part), in the case where a reference value P has a constant value.

The upper part of FIG. 15 illustrates exemplary changes of the target control quantity Δθpt of the pinion angle, and the lower part of FIG. 15 illustrates changes of an actual control quantity (control output) Δθp of the pinion angle. In FIG. 15, the changes of the target control quantity Δθpt and the actual control quantity Δθp are indicated by line graphs so that the changes are clearly illustrated.

In particular, in the upper part of FIG. 15, the one-dot chain line indicates exemplary changes of the target control quantity Δθpt of the pinion angle, regarding the case of conventional trajectory control where the rudder angle of the front wheels are controlled by feedback control. The target control quantity Δθpt is assumed to become equal to or more than the reference value P at a point of time ts. The broken line indicates changes of the target control quantity Δθpt calculated in the current cycle (time t=0) until the c-th cycle (time t=tc).

As illustrated in the lower part of FIG. 15, in the case of conventional trajectory control, in a situation in which the magnitude of the target control quantity Δθpt is less than the reference value P, that is, until the point of time ts, the actual control quantity Δθp of the pinion angle remains 0, and the rudder angle of the front wheels are not controlled actually. In other words, even in a situation in which the magnitude of the target control quantity Δθpt becomes equal to or more than the reference value P later, the front wheels are not turned until the point of time ts when the magnitude of the target control quantity Δθpt becomes equal to or more than the reference value P.

In contrast, according to each embodiment described above, when it is determined that the probability is high that the target control quantity Δθpt has a sign identical to that for the current cycle and the magnitude thereof increases to the reference value P or above by the c-th cycle, the magnitude of the target control quantity Δθpt1 for the current cycle is increasingly corrected to the reference value P. When the magnitude of the target control quantity Δθpt1 is increasingly corrected to the reference value P, the front wheels are turned based on the target control quantity Δθpt1 having the magnitude of P, whereby the rudder angle thereof is actually controlled.

Further, as the control of the rudder angle of the front wheels is started earlier, the quantity of control of the ruder angle of the front wheels that should be executed thereafter is decreased. Therefore, the magnitude of the target control quantity Δθpt1 is increasingly corrected repeatedly, and as the number of times of the execution increases, the magnitude of the target control quantity Δθpt gradually decreases, as indicated by the two-dot chain line in the upper part of FIG. 15.

As the magnitude of the target control quantity Δθpt decreases gradually, the magnitude of the target control quantity Δθpt becomes equal to or more than the reference value P at a time later than the point of time ts, for example, at a point of time ts'. Therefore, as indicated by the solid line in the lower part of FIG. 15, the magnitude of the target control quantity Δθpt1 is increasingly corrected to the reference value P during the section from the current cycle to the point of time ts', whereby the rudder angle of the front wheels is controlled based on the target control quantity Δθpt having a magnitude of P by the point of time ts'. Therefore, the control of the rudder angle of the front wheels, which is not started before the point of time ts in the case of conventional trajectory control, can be started earlier, from the current cycle. In other words, the steering of the front wheels by trajectory control can be caused to approach to a steering operation by a skilled driver who can carry out a correct steering operation based on correct prediction.

Further, the steering workload of the front wheels for trajectory control in each embodiment described above is considered to be identical to the steering workload of the front wheels in the conventional trajectory control. In the lower part of FIG. 15, the steering workload of the front wheels in each embodiment described above corresponds to the area of the region indicated by hatching falling left, and the steering workload of the front wheels in conventional trajectory control corresponds to the area of the region indicated by hatching falling right. These areas are considered to be substantially identical to each other.

Therefore, according to each embodiment described above, as compared with the case of conventional trajectory control, the area of the region indicated by hatching falling left in the region after the point of time ts can be reduced by the area of the region indicated by hatching falling left in the region before the point of time ts. In other words, according to each embodiment described above, as compared with the case of conventional trajectory control, the magnitude of the actual control quantity Δθp of the pinion angle in the region after the point of time ts can be reduced. Therefore, according to each embodiment described above, as compared with the case of conventional trajectory control, the magnitude of the actual control quantity Δθp of the pinion angle at the start of trajectory control and the like can be caused to gradually increase, whereby changes of the vehicle behavior caused by increase of the magnitude of the control quantity Δθp can be reduced.

Further, according to each embodiment described above, even in such a situation that the probability is high that the magnitude of the target control quantity Δθpt of the pinion angle increases to the reference value P or above by the c-th cycle, when the magnitude is increasing with a sign opposite to the sign for the current cycle, the magnitude of the target control quantity Δθpt1 for the current cycle is not increased for correction. Therefore, for example, in such a situation as illustrated in FIG. 8, it is possible to surely prevent the target control quantity Δθpt1 for the current cycle from being unnecessarily corrected in a steering direction opposite to such a steering direction that the magnitude of the target control quantity Δθpt becomes equal to or more than the reference value P.

Further, according to Third to Seventh Embodiments, unless the magnitude of the target control quantity Δθpt1 for the current cycle is equal to or more than the control permission reference value Q, the magnitude of the target control quantity Δθpt1 for the current cycle is not increasingly corrected to the reference value P, even if the other conditions are satisfied. Therefore, in such a situation that the magnitude of the target control quantity Δθpt1 for the current cycle is smaller than the threshold value of the dead band of trajectory control, the target control quantity Δθpt1 for the current cycle is prevented from being unnecessarily increased for correction.

It should be noted that in First and Second Embodiments, it is not determined whether the magnitude of the target control quantity Δθpt1 for the current cycle is equal to or more that the control permission reference value Q. In these embodiments as well, however, the configuration may be modified as follows; when the results of the determinations in steps 320 and 420 are affirmative, for example, it may be determined whether the absolute value of the target control quantity $\Delta\theta pt1$ for the current cycle is equal to or more than Q; then, when the results of the determinations are affirmative, the control proceeds to steps 330 and 425, respectively, and when the results of the determinations are negative, the control proceeds to steps 360 and 450, respectively. According to these modifications, in First and Second Embodiments as well, in such a situation that the magnitude of the target pinion angle $\theta pt0$ for the current cycle is very small, the target control quantity $\Delta\theta pt1$ for the current cycle is prevented from being unnecessarily increased for correction.

Further, in each embodiment described above, the reference value P is a constant value, but the configuration may be modified so that, for example, the reference value P is set so as to be smaller as the vehicle speed V is higher, as the value of the point of time ts is smaller, and as the increase ratio of the magnitude of the target control quantity $\Delta\theta pt$ of the pinion angle is greater; thus, the reference value P may be set so as to vary according to at least one of the above-described parameters. Alternatively, the reference value P, for example, may be set variably so as to decrease as temperatures at positions preliminarily set in the rudder angle varying device 14 and the EPS 22 are lower. In other words, the reference value P may be variably set so as to decrease as it is more preferable that the rudder angle control of the front wheels for trajectory control is started earlier, and as the rudder angle varying device 14 and the EPS 22 have lower responsiveness.

Figure 16:
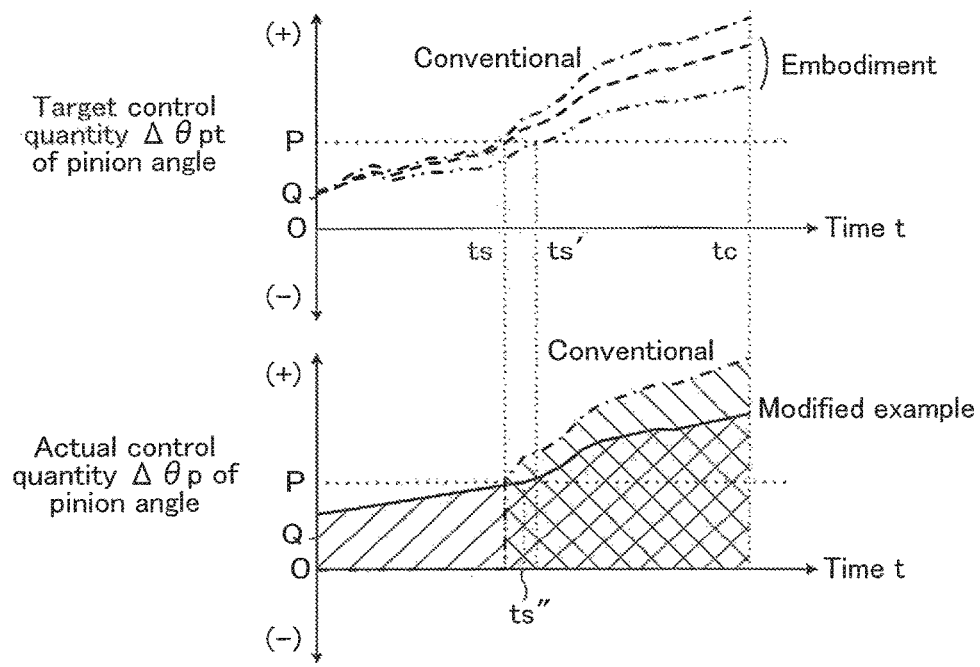
FIG. 16 illustrates exemplary changes of a target control quantity Δθpt1 of a pinion angle (upper part) and changes of an actual control quantity (control output) Δθp of the pinion angle (lower part), in the case where a reference value P is set variably.

In particular, in the case where the reference value P is variably set so as to be smaller as it is more preferable that the rudder angle control of the front wheels for trajectory control is started earlier, the reference value P may be gradually increased with the elapse of time to the original value thereof, as indicated, for example, in FIG. 16 as the modified example. In this case, the control quantity when the rudder angle control of the front wheels for trajectory control is started can be set smaller as compared with the cases of the embodiments described above. Further, the magnitude of the target control quantity $\Delta\theta pt$ of the pinion angle becomes equal to or more than the reference value P at a point of time ts" that is after the point of time ts and before the point of time ts'.

Further, in each embodiment described above, the control permission reference value Q is a constant value, but as is the case with the reference value P, the configuration may be modified so that, for example, the control permission reference value Q is set so as to be smaller as the vehicle speed V is higher, as the value of the point of time ts is smaller, and as the increase ratio of the magnitude of the target control quantity $\Delta\theta pt$ of the pinion angle is greater; thus, the control permission reference value Q may be set so as to vary according to at least one of the above-described parameters. Alternatively, the reference value Q may be variably set so as to be smaller as temperatures at positions preliminarily set in the rudder angle varying device 14 and the EPS 22 are lower.

Further, in each embodiment described above, "a" to "c" indicative of the cycles are constant, but at least "b" or "c" that decides the second cycle may be variably set so as to, for example, be greater as the vehicle speed V is higher, and as temperatures at positions preliminarily set in the rudder angle varying device 14 and the EPS 22 are lower. In other words, "b" or "c" may be variably set so as to be greater as it is more preferably determined that the probability is high that the magnitude of the target control quantity $\Delta\theta pt$ of the pinion angle increases to the reference value P or above by the second cycle at the latest.

So far the present invention is described in detail regarding particular embodiments, but it will be evident to those skilled in the art that the present invention is not limited to the above-described embodiments, and other various embodiments should be possible within the scope of the present invention.

For example, in each embodiment described above, as the target control quantity for automatic steering control among automatic drive control, the magnitude of the target control quantity $\Delta\theta pt$ of the pinion angle for trajectory control is increasingly corrected as required. Alternatively, however, the magnitude of the target braking/driving force, which is a target control quantity for automatic braking/driving force control among automatic drive control, may be increasingly corrected as required, or both of the magnitude of the target control quantity for automatic steering control and the magnitude of the target control quantity for automatic braking/driving force control may be increasingly corrected as required. Alternatively, only one of the magnitude of the target driving force and the magnitude of the target braking force may be increasingly corrected as required, as a target control quantity for automatic braking/driving force control.

Further, in each embodiment described above, automatic steering control is executed so as to achieve trajectory control for causing a vehicle to travel along a target trajectory. Automatic steering control, however, may be any arbitrary rudder angle control as long as the control is control for automatically steering the left and right front wheels; for example, the same may be lane deviation prevention control for controlling a vehicle so that the vehicle should not deviate from a lane, or may be control for causing a vehicle to travel following a vehicle ahead.

Further, in each embodiment described above, when it is determined that the probability is high that the target control quantity $\Delta\theta pt$ of the pinion angle has a sign identical to that for the current cycle and the magnitude thereof increases to the reference value P or above by the c-th cycle, the magnitude of the target control quantity $\Delta\theta pt1$ for the current cycle is increasingly corrected to the reference value P. When, however, the increase ratio of the magnitude of the target control quantity $\Delta\theta pt$ is great, for example, the magnitude of the target control quantity $\Delta\theta pt1$ may be increasingly corrected to a value greater than the reference value P.

Further, a part of each embodiment described above may be replaced with a part of another embodiment. For example, the determination regarding whether the probability is high that the magnitude of the target control quantity $\Delta\theta pt$ of the pinion angle increases to the reference value P or above by the c-th cycle is executed by determinations in steps 840, 860 and steps 945, 960 in Sixth and Seventh Embodiments described above, respectively. The determination of the probability described above, however, may be other determinations such as steps 340, 445 and 530, 550 in First to Third Embodiments.

Still further, in each embodiment described above, the left and right front wheels, which are steered wheels, are steered by the rudder angle varying device 14 and the EPS 22 that rotate the lower steering shaft 30 relatively with respect to the upper steering shaft 28. The rudder angle varying device for steering the steered wheels, however, may be a by-wire type steering device.

REFERENCE SIGNS LIST

10 . . . Automatic drive control device
12 . . . Vehicle
14 . . . Rudder angle varying device
16 . . . Electronic control device
22 . . . Electric power steering device (EPS)
50 . . . Braking device
60 . . . Engine
62 . . . Transmission device

The invention claimed is:

1. An automatic drive control method for a vehicle, wherein a target control quantity for automatically controlling at least either one of a rudder angle of a steered wheel and a braking/driving force of the vehicle is calculated for each control cycle according to a driving situation of the vehicle, and at least either one of the rudder angle of the steered wheel and the braking/driving force of the vehicle is automatically controlled based on the target control quantity, the method comprising the steps of:
   calculating at least a target control quantity for a current cycle and target control quantities for a first cycle to a second cycle as future target control quantities, the first and second cycles being after the current cycle; and
   increasingly correcting a magnitude of the target control quantity for the current cycle to a value equal to or more than a preliminarily set reference value, in a situation in which the magnitude of the target control quantity for the current cycle is less than the reference value, in the case where it is determined based on the future target control quantities that a probability is high that the future target control quantity has a sign identical to the sign of the target control quantity for the current cycle and the magnitude thereof increases to the reference value or above by the second cycle at the latest.

2. The automatic drive control method for a vehicle according to claim 1, wherein:
   the reference value is set to at least either one of:
      a value of a control quantity having a minimum magnitude, among control quantities that cause a device for changing a rudder angle of the steered wheel to change the rudder angle of the steered wheel; and
      a value of a control quantity having a minimum magnitude, among control quantities that cause a device for generating a braking/driving force for the vehicle to generate a braking/driving force.

3. The automatic drive control method for a vehicle according to claim 1, wherein:
   the number of cycles from the current cycle to the second cycle is variably set according to a vehicle speed so as to increase as the vehicle speed is higher.

4. The automatic drive control method for a vehicle according to claim 2, wherein:
   the number of cycles from the current cycle to the second cycle is variably set according to a vehicle speed so as to increase as the vehicle speed is higher.

* * * * *